United States Patent
Forrest

(10) Patent No.: US 9,243,690 B2
(45) Date of Patent: Jan. 26, 2016

(54) MULTISPEED DRIVE UNIT

(71) Applicant: AUBURN GEAR, INC., Auburn, IN (US)

(72) Inventor: James L. Forrest, Ashley, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 14/380,556

(22) PCT Filed: Nov. 30, 2012

(86) PCT No.: PCT/US2012/067397
§ 371 (c)(1),
(2) Date: Aug. 22, 2014

(87) PCT Pub. No.: WO2013/130142
PCT Pub. Date: Sep. 6, 2013

(65) Prior Publication Data
US 2015/0011351 A1 Jan. 8, 2015

Related U.S. Application Data

(60) Provisional application No. 61/604,822, filed on Feb. 29, 2012.

(51) Int. Cl.
*F16H 31/00* (2006.01)
*F16H 3/44* (2006.01)
(Continued)

(52) U.S. Cl.
CPC .. *F16H 3/44* (2013.01); *F16H 3/54* (2013.01); *F16H 63/3026* (2013.01);
(Continued)

(58) Field of Classification Search
None
See application file for complete search history.

(56) References Cited

U.S. PATENT DOCUMENTS 2,331,684 A * 10/1943 Henningsen ............... 475/299
2,472,559 A *  6/1949 Arnold et al. ............... 475/145
(Continued)

FOREIGN PATENT DOCUMENTS

EP    0676568 A1   10/1995
EP    0659250 B1    7/1996
(Continued)

OTHER PUBLICATIONS

IPRP mailed Sep. 2, 2014 from the International Bureau in priority application No. PCT/US212/067397.
(Continued)

*Primary Examiner* — Dirk Wright
(74) *Attorney, Agent, or Firm* — Faegre Baker Daniels LLP

(57) ABSTRACT

A multispeed drive unit (10) comprising a rotary input (27) positioned to be driven by a power source and disposed at an input side of the drive unit (10); a rotary output (28) positioned to drive a driven unit and disposed at an output side of the drive unit (10), a transmission operably interposed between said rotary input (27) and said rotary output (28), said transmission having a gear (20) moveable between a high-reduction configuration and a low-reduction configuration, a first friction clutch (40) operable to fix said gear (20) in said high-reduction configuration, whereby said transmission is operable to reduce a speed of said rotary output (28) relative to said rotary input (27) when said first friction clutch (40) is engaged, and a second friction clutch (60) operable to fix said gear (20) in said low-reduction configuration, whereby said transmission is not operable to reduce the speed of said rotary output (28) relative to said rotary input (2) when said second friction clutch (60) is engaged.

22 Claims, 17 Drawing Sheets

(51) Int. Cl.
*F16H 3/54* (2006.01)
*F16H 63/30* (2006.01)
*F16H 57/08* (2006.01)

(52) U.S. Cl.
CPC .. *F16H 2057/087* (2013.01); *F16H 2063/3033* (2013.01); *F16H 2200/0034* (2013.01); *F16H 2200/2005* (2013.01); *F16H 2200/2035* (2013.01)

(56) References Cited

U.S. PATENT DOCUMENTS

| | | | |
|---|---|---|---|
| 2,870,655 A * | 1/1959 | Rockwell | 475/142 |
| 2,918,832 A * | 12/1959 | Meyers | 475/142 |
| 4,026,167 A * | 5/1977 | Archer | 475/141 |
| 4,084,482 A | 4/1978 | Derrien | |
| 4,128,023 A | 12/1978 | Kinder | |
| 4,181,042 A * | 1/1980 | Rau et al. | 475/138 |
| 4,287,781 A | 9/1981 | Zenker | |
| 4,407,399 A | 10/1983 | Wolff | |
| 4,484,495 A * | 11/1984 | Mason | 475/157 |
| 4,774,857 A | 10/1988 | Heine et al. | |
| 4,791,833 A * | 12/1988 | Sakai et al. | 475/299 |
| 4,854,192 A | 8/1989 | Churchill et al. | |
| 5,006,100 A * | 4/1991 | Brandt et al. | 475/138 |
| 5,024,636 A | 6/1991 | Phebus et al. | |
| 5,277,527 A * | 1/1994 | Yokota et al. | 408/139 |
| 5,478,290 A | 12/1995 | Buck et al. | |
| 5,489,013 A | 2/1996 | Buuck et al. | |
| 5,735,767 A | 4/1998 | Forsyth | |
| 6,142,242 A * | 11/2000 | Okumura et al. | 173/48 |
| 6,824,493 B2 * | 11/2004 | Alfredsson | 475/299 |
| 6,849,024 B2 * | 2/2005 | Hayashi et al. | 475/312 |
| 6,935,986 B2 | 8/2005 | Hvolka et al. | |
| 6,984,188 B2 * | 1/2006 | Potter et al. | 475/298 |
| 6,997,840 B2 | 2/2006 | Stevenson | |
| 7,479,084 B2 * | 1/2009 | Alfredsson | 475/209 |
| 7,524,260 B2 | 4/2009 | Correia et al. | |
| 7,537,536 B2 | 5/2009 | Hvolka et al. | |
| 8,123,645 B2 | 2/2012 | Schimke | |
| 8,235,853 B2 * | 8/2012 | Lutoslawski | 475/5 |
| 8,727,931 B2 * | 5/2014 | Hafner | 475/299 |
| 2003/0089569 A1 | 5/2003 | Antonov et al. | |
| 2003/0096671 A1 | 5/2003 | Tanzer et al. | |
| 2009/0203489 A1 | 8/2009 | Okabe et al. | |
| 2010/0279810 A1 | 11/2010 | Heuver | |
| 2010/0285918 A1 | 11/2010 | Fitzgerald et al. | |
| 2012/0100957 A1 | 4/2012 | Reitz | |
| 2014/0206494 A1 * | 7/2014 | Geis-Esser et al. | 475/271 |

FOREIGN PATENT DOCUMENTS

| | | |
|---|---|---|
| EP | 0745199 B1 | 8/1998 |
| EP | 0916872 A1 | 5/1999 |
| EP | 0895566 B1 | 1/2000 |
| EP | 1288517 A1 | 3/2003 |
| GB | 2264758 A | 9/1993 |
| WO | WO96/02769 A1 | 2/1996 |

OTHER PUBLICATIONS

International Search Report and Written Opinion mailed Feb. 27, 2013 from the International Searching Authority in priority application No. PCT/US212/067397.

* cited by examiner

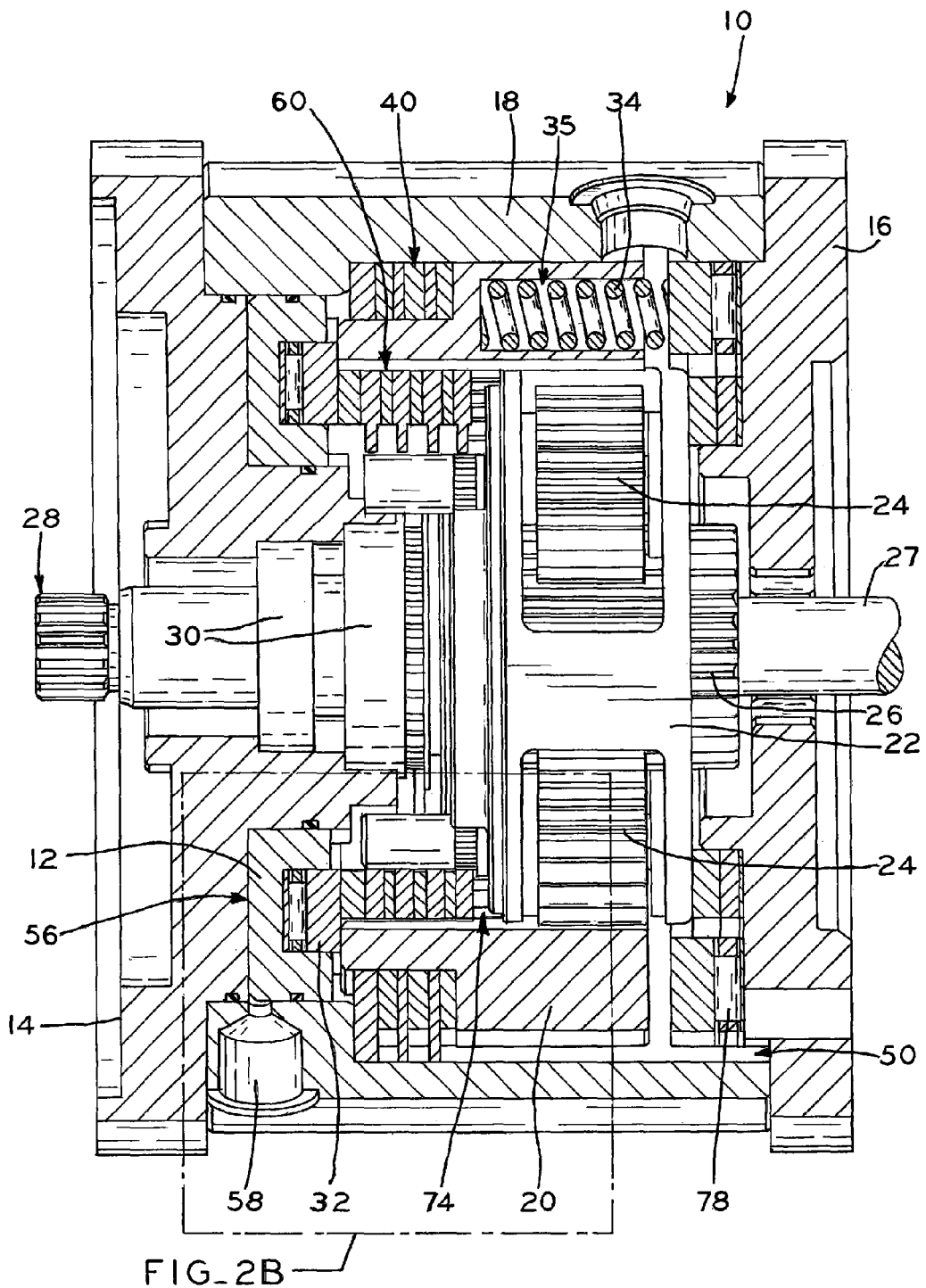
FIG_2A

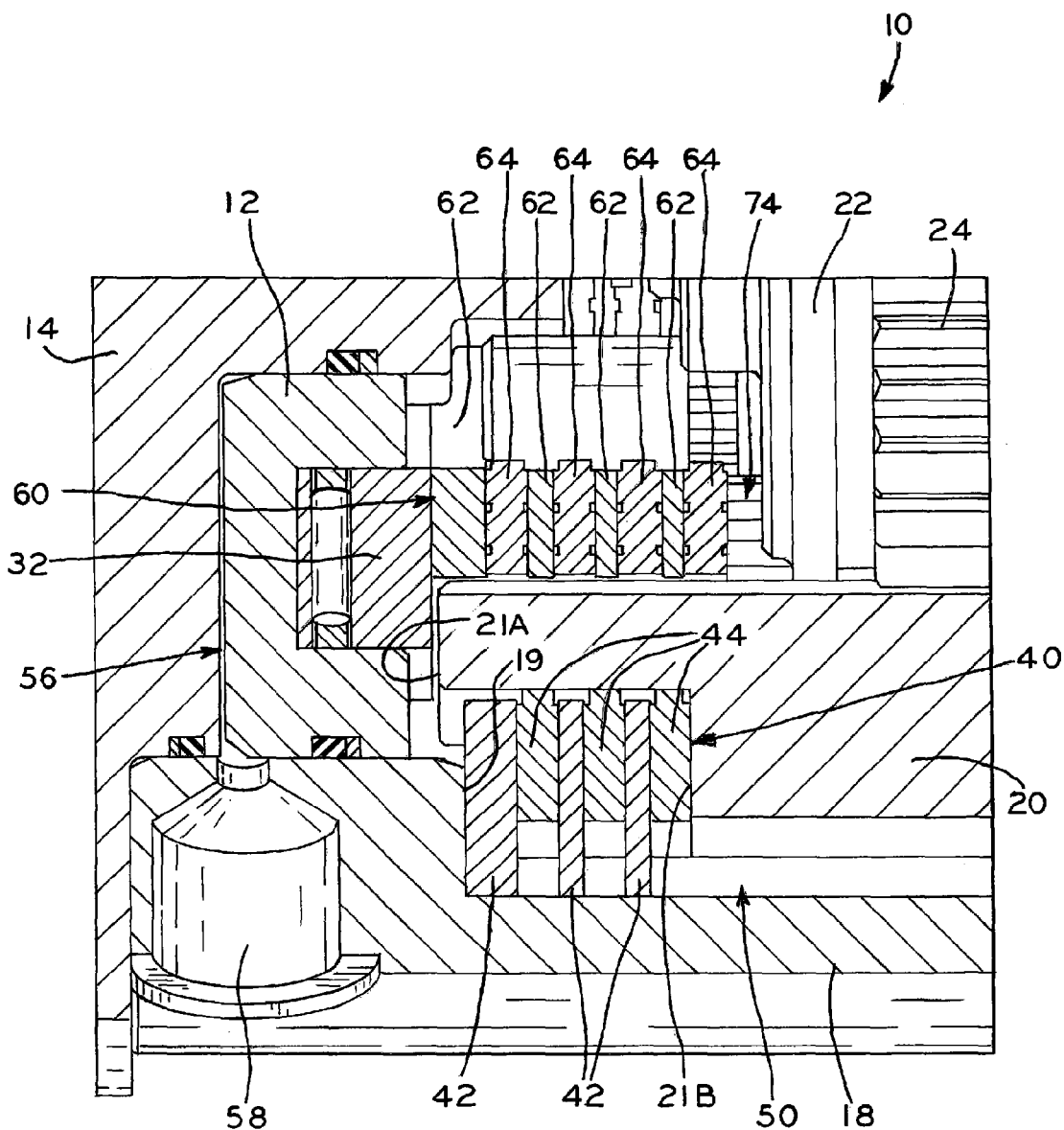
FIG_2B

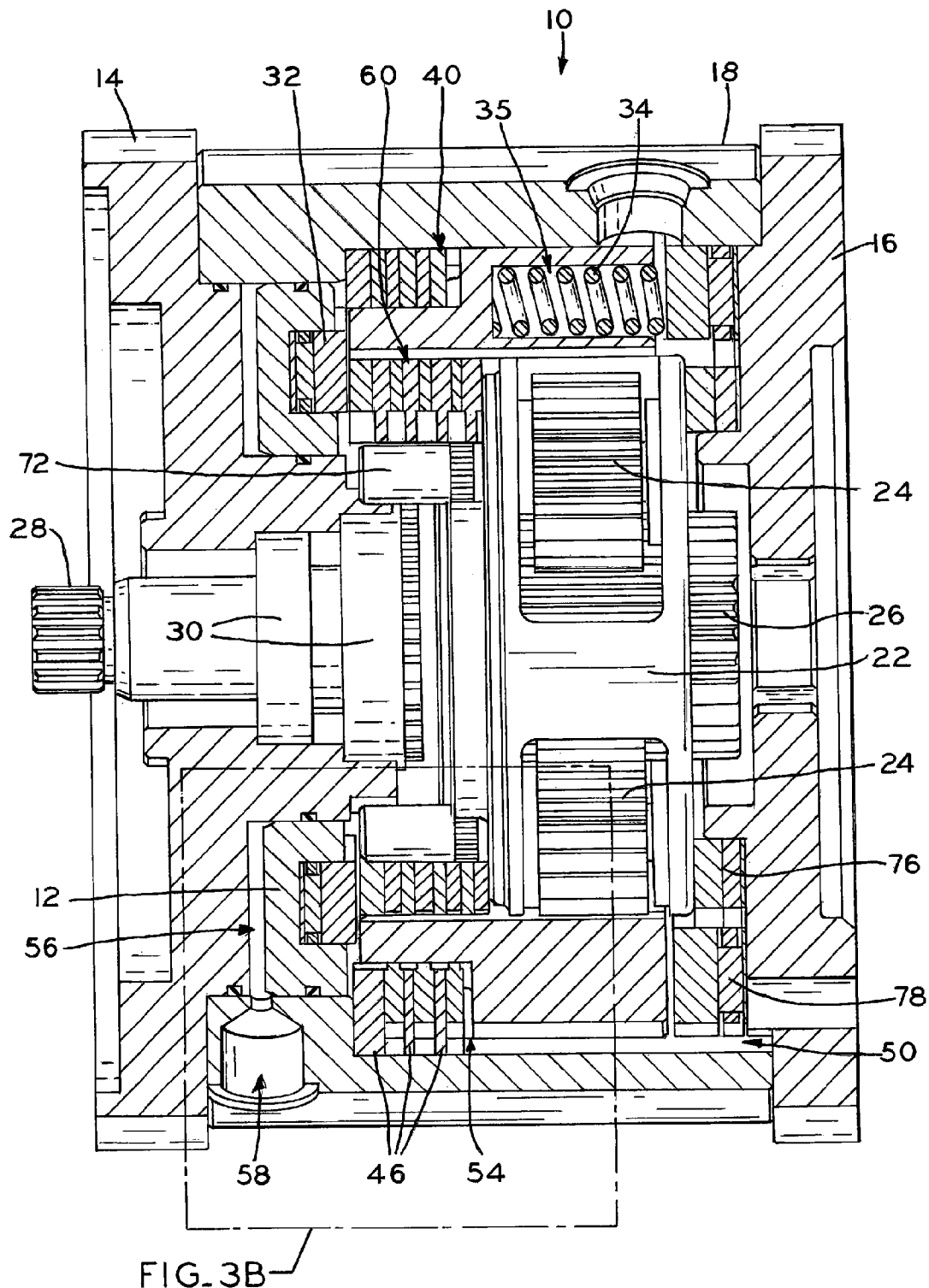
FIG_3A

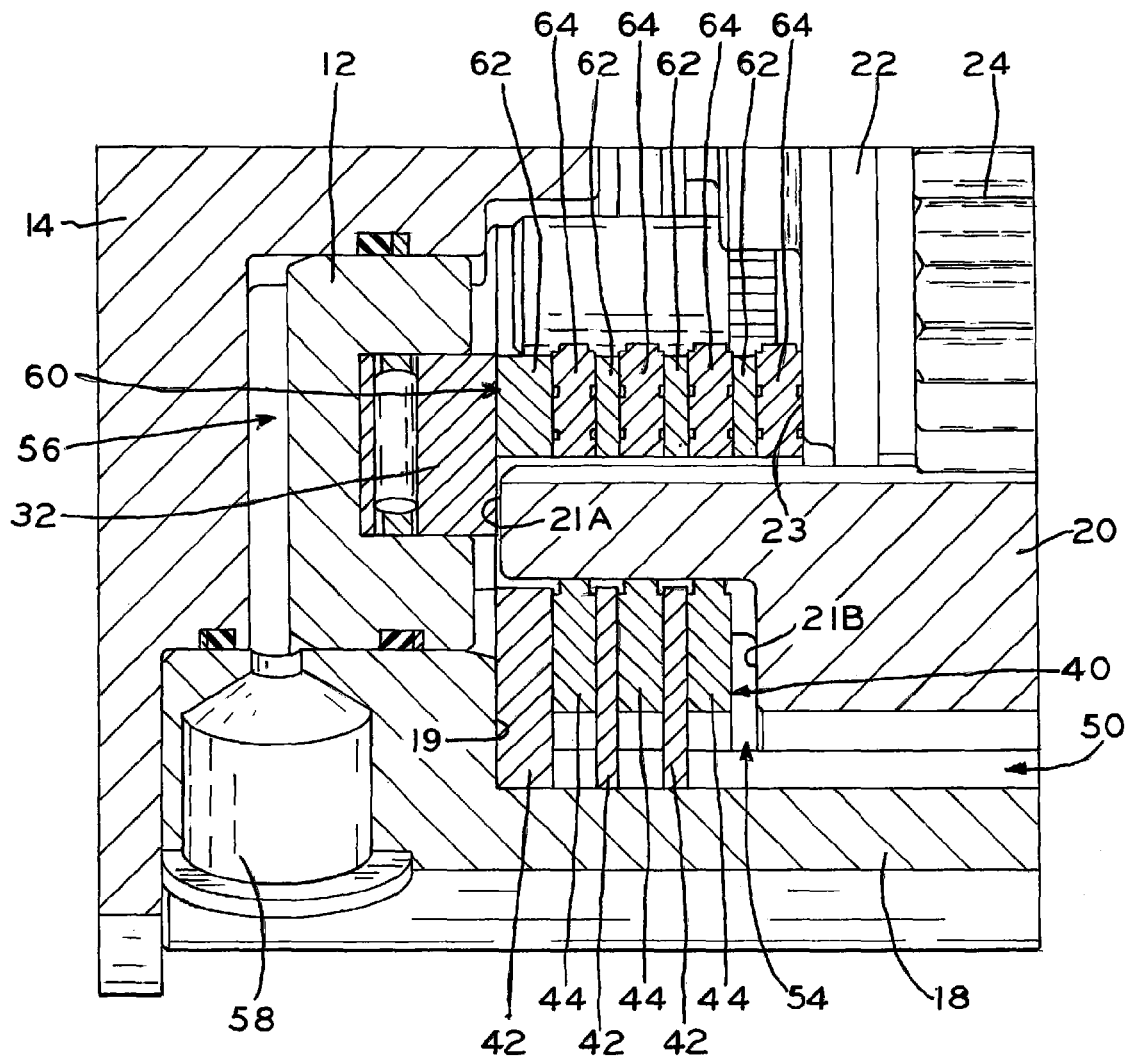
FIG_3B

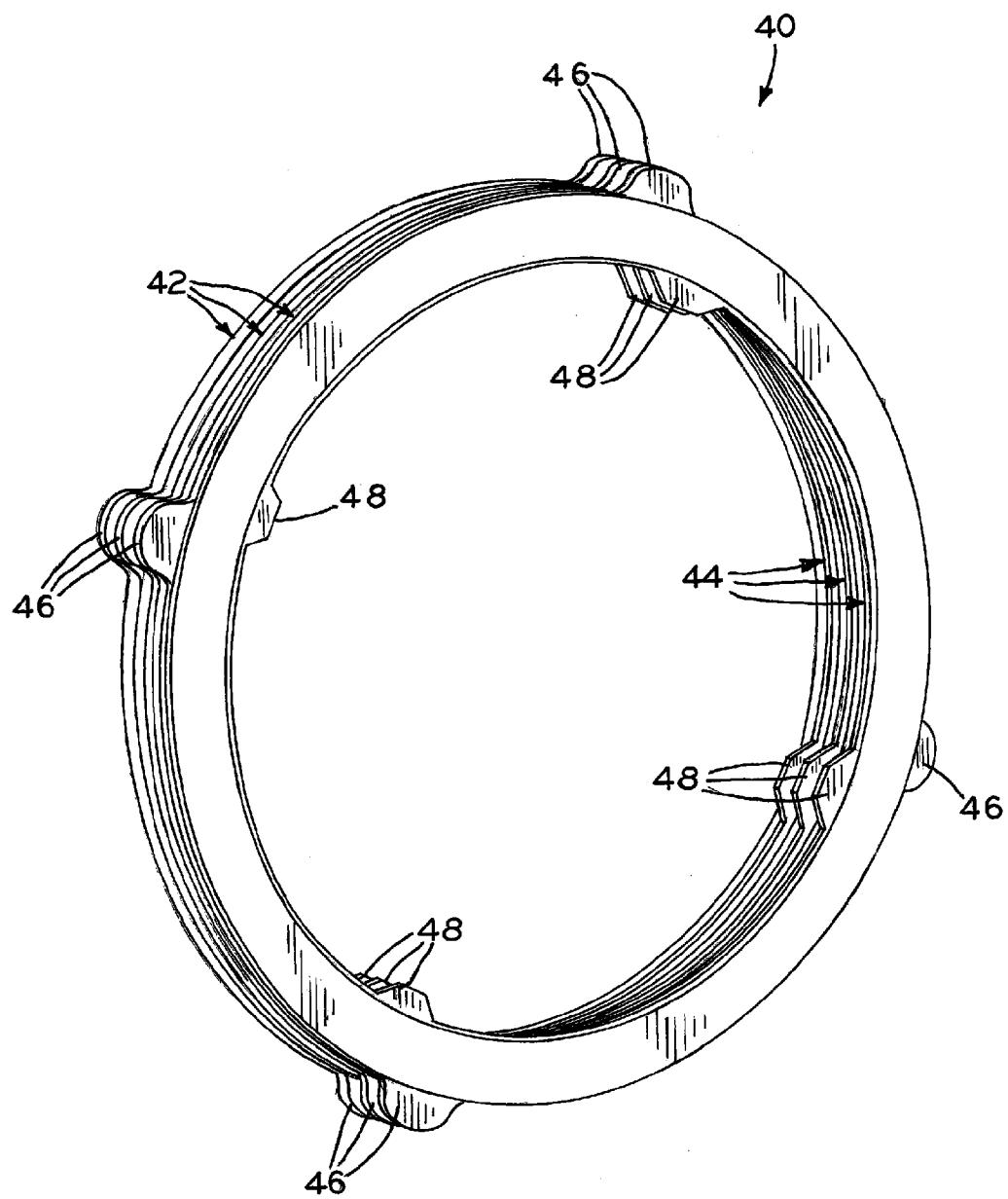
FIG_4A

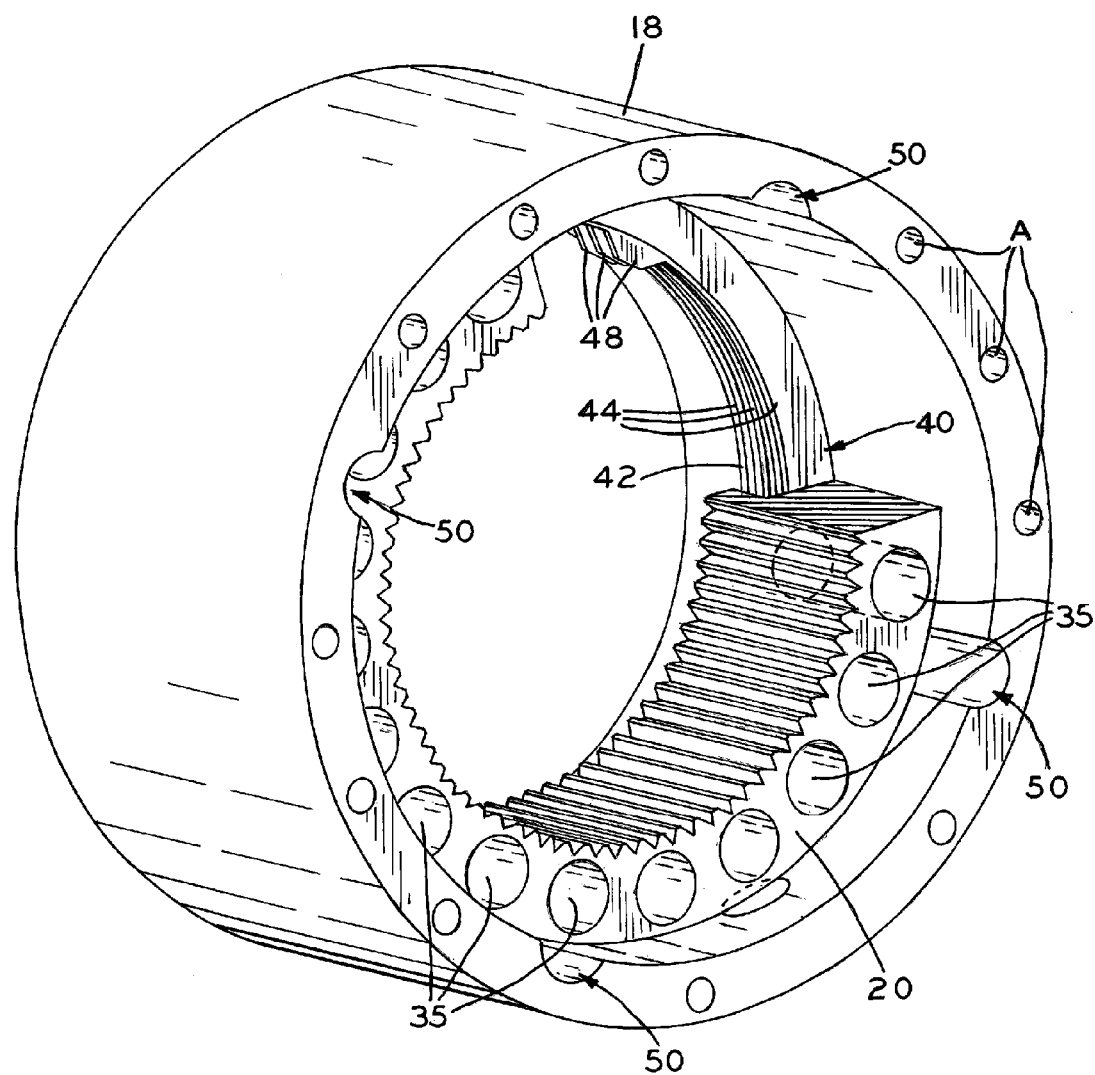
FIG_4D

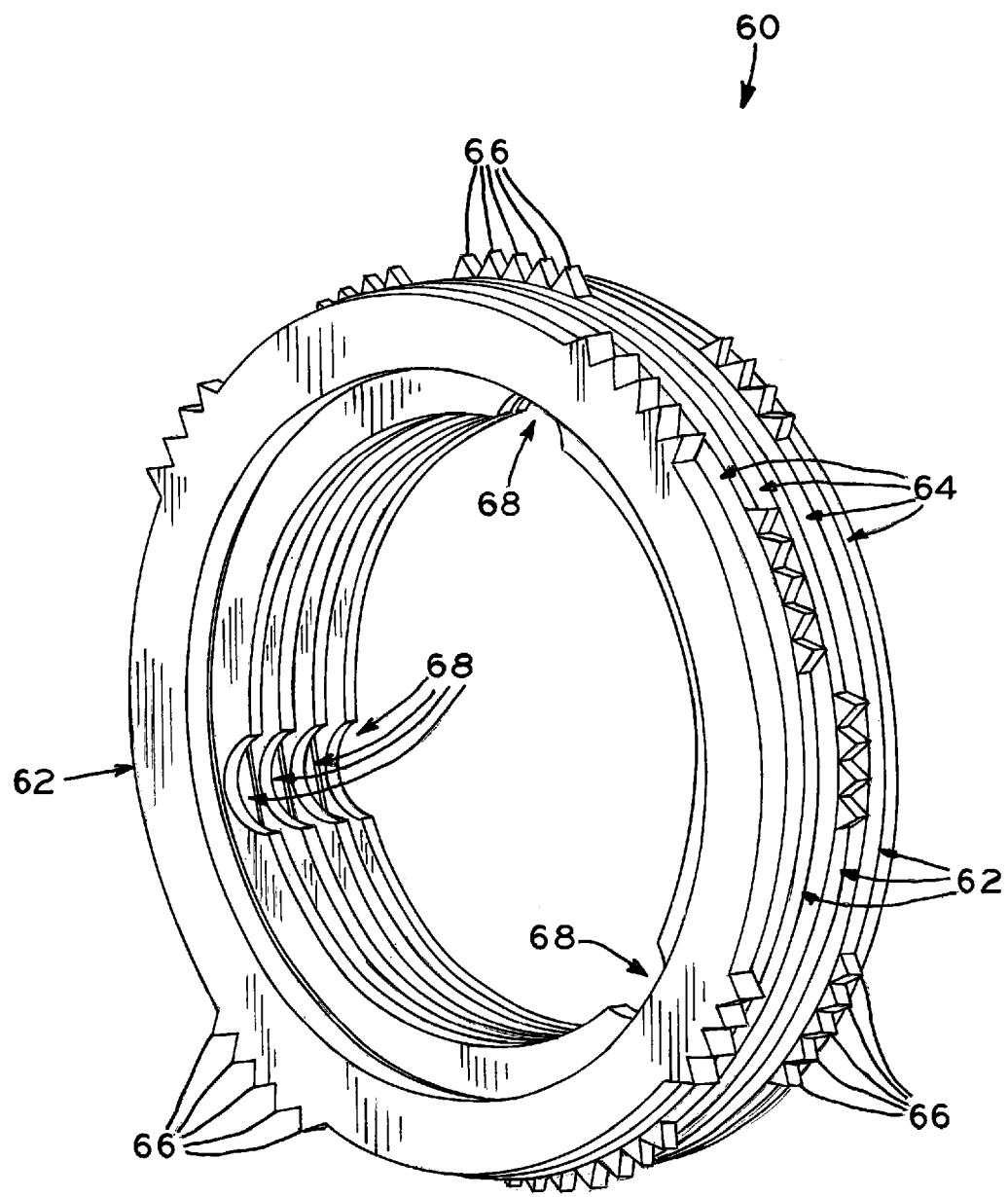
FIG_5A

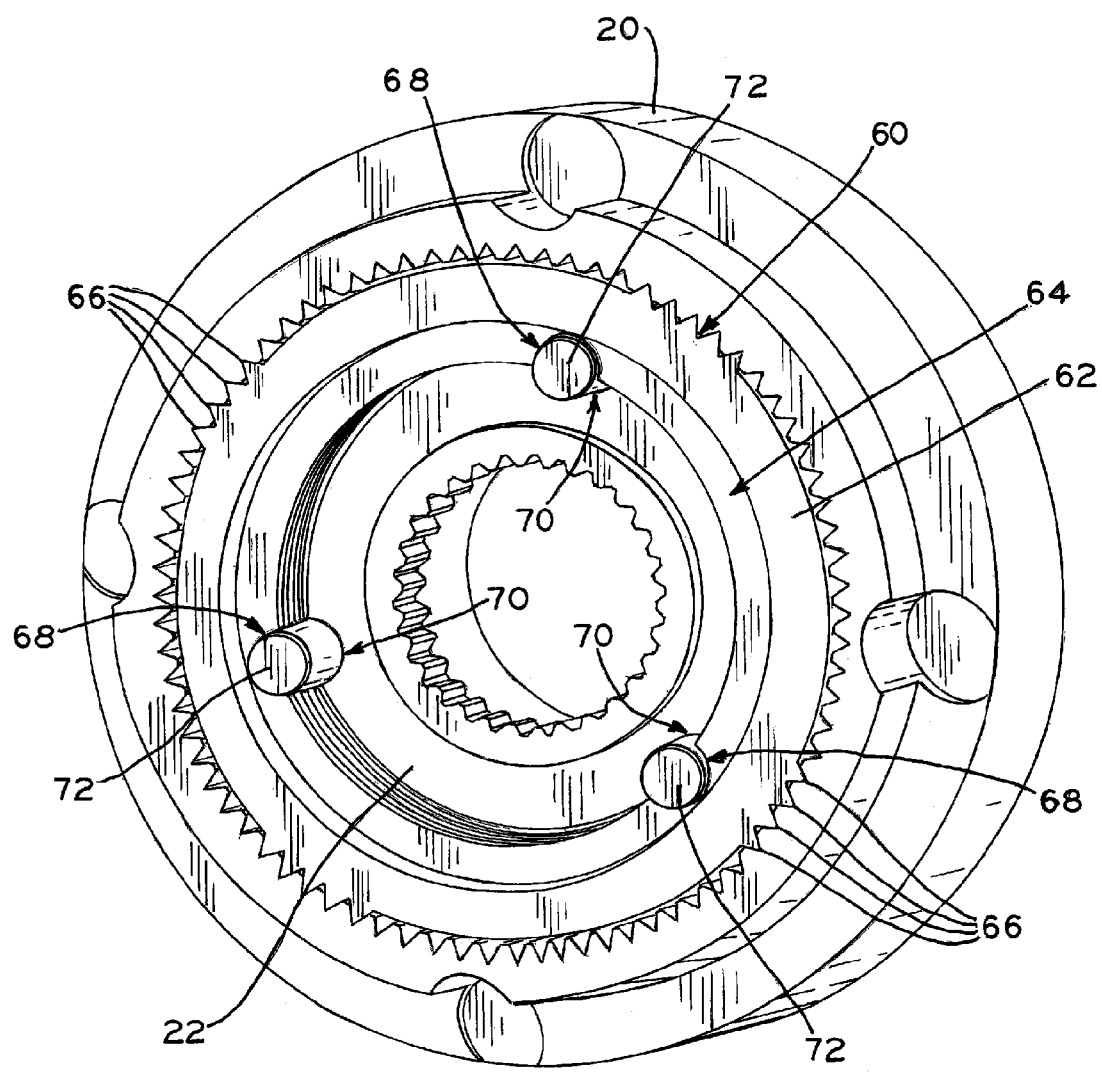
FIG_5B

MULTISPEED DRIVE UNIT

CROSS-REFERENCE TO RELATED APPLICATIONS

This application is a National Phase entry of PCT Application No. PCT/US2012/067397, filed Nov. 30, 2012 and entitled MULTISPEED DRIVE UNIT, which claims the benefit under 35 U.S.C. §119(e) of U.S. Provisional Patent Application Ser. No. 61/604,822 filed Feb. 29, 2012 entitled MULTISPEED DRIVE UNIT, the entire disclosures of which are hereby incorporated by reference herein.

BACKGROUND OF THE INVENTION

1. Technical Field

The present disclosure relates to vehicle power transmission units, and, more particularly, to remotely-actuatable multispeed transmission units.

2. Description of the Related Art

Large industrial machinery systems, such as earth moving equipment and other construction vehicles and apparatuses, may use individual power transmission units mounted at the system's driven endpoint. For example, gear reduction units mounted at the hub of each driven wheel can convert the relatively high rotational speeds of driven input shafts into lower rotation speeds, thereby accommodating the large-diameter wheels, heavy loads and low speeds frequently encountered by heavy duty construction vehicles. In another example, independent gear reduction units may be used in drilling devices such as earth augers, in order to provide the low-speed, high-torque auger rotation needed for drilling holes in tightly packed soil.

Such individual power transmission units are sometimes referred to as drive units, and include a housing which encases a transmission linking an external power source to a driven unit. Where the power source is external (e.g., a vehicle motor and/or primary vehicle transmission), the drive unit may be referred to as a nonintegrated drive unit. Alternatively, integrated drive units include an integral power input device, such as an attached hydraulic motor. For example, integrated drive units may utilize a hydraulic motor which is linked to the drive unit via a motor output shaft coupled to an input shaft of the drive unit. The drive unit has its own output shaft or output hub which links to the driven unit (such as a wheel or auger as noted above). For the purposes of the present disclosure, "drive unit" generically refers to both nonintegrated and integrated drive units.

In some cases, multispeed drive units capable of shifting between varying levels of gear reduction may be desirable. For example, in the case of heavy duty construction vehicles, a drive unit having high and low gear reduction configurations may be provided. The high gear reduction configuration provides low-speed, high-torque power transmission, such as for uneven terrain at a construction site. The low gear reduction configuration provides higher potential wheel rotation speeds, such as for driving the vehicle on maintained roads. In the case of industrial augers, the high-torque, low-speed mode (i.e., the high gear reduction configuration) may be used for drilling and deepening holes in the earth, while the lower-torque, higher-speed mode (i.e., the low-reduction configuration) may be used for quickly extracting the auger bit from a drilled hole and dislodging soil from the surface of the drill bit.

Substantial design efforts have focused on providing multispeed drive units which can be easily toggled between low and high gear reduction values. For example, hydraulically actuated wheel drive units may employ multiple hydraulic actuators which operate to engage and/or disengage internal gearing mechanisms to toggle between high- and low-reduction configurations (such as by toggling clutch mechanisms between engaged and disengaged configurations). However, such multi-actuator drive unit designs require careful synchronization of the various actuators to function properly, with the attendant cost and system complexity associated with such synchronization.

Other designs may include a mechanical shift, such as a movable or translatable gear which selectively engages higher or lower gear reduction assemblies depending on the physical location of the movable gear. However, such mechanical shift drive units require that the driven unit be stopped prior to toggling the movable gear, and may require that internal pressures on the movable gear be relieved prior to such toggling.

SUMMARY OF THE INVENTION

The present disclosure provides a multispeed drive unit which utilizes a single piston to toggle between multiple high and low gear reduction ratios. The drive unit includes a pair of clutch mechanisms, each of which acts upon a moveable ring gear of a planetary transmission. With the piston in a high-reduction position, one of the pair of clutch mechanisms engages while the other remains disengaged, such that the other planetary transmission components are allowed to rotate with respect to the ring gear, which is rotationally fixed. In this arrangement, the planetary transmission is operable to provide a high gear reduction. When the piston is shifted to a low-reduction position, the previously-engaged clutch mechanism disengages, and the previously-disengaged clutch mechanism engages. In this arrangement, the ring gear is free to rotate, and is fixed to the planet gear carrier of the planetary transmission, such that the planetary transmission provides no gear reduction.

A drive unit utilizing a remotely actuated, single piston design in cooperation with a ring gear/clutch pack arrangement in accordance with the present disclosure facilitates rapid, in-service toggling between high and low gear reductions, while utilizing robust, reliable and low-cost design principles.

In one form thereof, the present disclosure provides a multispeed drive unit including: a rotary input positioned to be driven by a power source and disposed at an input side of the drive unit; a rotary output positioned to drive a driven unit and disposed at an output side of the drive unit; a transmission operably interposed between the rotary input and the rotary output, the transmission having a gear moveable between a high-reduction configuration and a low-reduction configuration; a first friction clutch operable to fix the gear in the high-reduction configuration, whereby the transmission is operable to reduce a speed of the rotary output relative to the rotary input when the first friction clutch is engaged; and a second friction clutch operable to fix the gear in the low-reduction configuration, whereby the transmission is not operable to reduce the speed of the rotary output relative to the rotary input when the second friction clutch is engaged.

In one aspect, the multispeed drive unit may further include an actuator and a biasing element, wherein: the gear is acted upon by the actuator which urges the gear into one of the first position and the opposed second position when the actuator is actuated; and the gear is acted upon by the biasing element which urges the gear into the other of the first position and the opposed second position when the actuator is not actuated.

The actuator may be configured to cause engagement of the second friction clutch while simultaneously allowing the first friction clutch to disengage when the actuator is actuated; and the biasing element is configured to cause engagement of the first friction clutch while simultaneously allowing the second friction clutch to disengage when the actuator is not actuated. The actuator may be a hydraulic actuator.

In another aspect, the gear may be moveable between a first position toward the input side of the drive unit and an opposed second position toward the output side of the drive unit, the gear in the high-reduction configuration at one of the first position and the opposed second position, and the gear in the low-reduction configuration at the other of the first position and the opposed second position.

In yet another aspect, the first friction clutch may include a plurality of clutch plates frictionally engageable with one another, the plurality of clutch plates alternately rotationally fixed to the gear and a rotationally fixed component of the multispeed drive unit, such that the gear and the rotationally fixed component are rotationally fixed to one another when the first friction clutch is engaged such that the gear is in the high-reduction configuration. The rotationally fixed component may be a housing of the multispeed drive unit interposed between the input side and the output side.

In still another aspect, the second friction clutch may include a plurality of clutch plates frictionally engageable with one another, the plurality of clutch plates alternately rotationally fixed to the gear and a component of the transmission, such that the gear and the transmission are rotationally fixed to one another when the second friction clutch is engaged such that the gear is in the low-reduction configuration.

In yet another aspect, the transmission is a planetary transmission assembly including: a sun gear having sun gear teeth formed on an outer surface thereof; at least one planet gear having planet gear teeth formed on an outer surface of the planet gear, the planet gear teeth intermeshingly engaged with the sun gear teeth such that rotation of the sun gear is capable of rotating the at least one planet gear; a planet gear carrier rotatably supporting the at least one planet gear, such that the at least one planet gear is independently rotatable with respect to the planet gear carrier; and the gear moveable between a high-reduction configuration and a low-reduction configuration including a ring gear having ring gear teeth formed on an inner surface of the ring gear, the ring gear teeth intermeshingly engaged with the planet gear teeth, the planet gear disposed between the ring gear and the sun gear such that torque is transmissible from the sun gear to the planet gear carrier via the planet gear.

The ring gear may be rotationally secured to the planet gear carrier when in the low-reduction configuration. The drive unit may include a rotationally fixed housing interposed between the input side and the output side, the ring gear rotationally secured to said housing when said ring gear is in said high-reduction configuration.

In yet another aspect, the rotary output may rotate at the same speed as the rotary input when the gear is in the low-reduction configuration. For example, the rotary input may rotate at between 2 and 10 times faster than the rotary output when the gear is in the high-reduction configuration.

In another form thereof, the present disclosure provides a multispeed drive unit including: a rotary input positioned to be driven by a power source and disposed at an input side of the drive unit; a rotary output positioned to drive a driven unit and disposed at an output side of the drive unit; a planetary transmission assembly operably interposed between the rotary input and the rotary output, the planetary transmission assembly including: a sun gear having sun gear teeth formed on an outer surface thereof; at least one planet gear having planet gear teeth formed on an outer surface of the planet gear, the planet gear teeth intermeshingly engageable with the sun gear teeth such that rotation of the sun gear is capable of rotating the at least one planet gear; a planet gear carrier rotatably supporting the at least one planet gear, such that the at least one planet gear is independently rotatable with respect to the planet gear carrier; and a ring gear having ring gear teeth formed on an inner surface of the ring gear, the ring gear teeth intermeshingly engageable with the planet gear teeth, the planet gear disposed between the ring gear and the sun gear such that torque is transmissible from the sun gear to the planet gear carrier via the planet gear, the ring gear selectively configurable into a high-reduction configuration and a low-reduction configuration by moving the ring gear toward one of the input side of the drive unit and the output side of the drive unit; a housing interposed between the input side and the output side, the housing stationary with respect to the planetary transmission assembly; a first clutch pack including: a first clutch plate rotatably fixed to an outer surface of the ring gear; and a second clutch plate rotatably fixed to an inner surface of the housing, the second clutch plate engageable with the first clutch plate to rotatably fix the ring gear to the housing when the ring gear is in the high-reduction configuration, the planetary transmission assembly operable to reduce a speed of the rotary output relative to the rotary input when the first and second clutch plates are engaged; and a second clutch pack including: a third clutch plate rotatably fixed to the inner surface of the ring gear; and a fourth clutch plate rotatably fixed to the planet gear carrier, the third clutch plate engageable with the fourth clutch plate to rotatably fix the ring gear to the planet gear carrier when the ring gear is in the low-reduction configuration, the planetary transmission assembly rotating as a single unit when the third and fourth clutch plates are engaged.

In one aspect, the multispeed drive unit further may further include: a biasing element urging the first and second clutch plates into engagement with one another, whereby the biasing element urges the ring gear into the high-reduction configuration; and a gearshift piston moveable between an actuated position and a non-actuated position, the gearshift piston allowing the first and second clutch plates to engage when in the non-actuated position, the gearshift piston urging the second clutch pack into engagement when in the actuated position, whereby the gearshift piston cooperates to toggle the ring gear between the high-reduction configuration and the-low reduction configuration.

The multispeed drive unit may further include a fluid inlet leading to a fluid chamber, the gearshift piston urged into the actuated position when pressurized fluid is received in the fluid chamber. The biasing element may act on the ring gear such that a shoulder of the ring gear is positioned to abut one of the first clutch plate and the second clutch plate to engage with the other of the first clutch plate and the second clutch plate when the gearshift piston is in the non-actuated position.

In another aspect, the multispeed drive unit may further include a low-friction interface between one of the third and fourth clutch plates and the gearshift piston, whereby rotation therebetween is facilitated when the second clutch pack is engaged. The first clutch pack may be disposed radially outwardly of the second clutch pack, whereby the first clutch pack is an outer clutch pack and the second clutch pack is an inner clutch pack.

In yet another aspect, the at least one planet gear may circumnavigate the sun gear when the ring gear is in the high-reduction configuration, and the ring gear may rotate at the same speed as with the sun gear when the ring gear is in the low-reduction configuration.

In yet another form thereof, the present disclosure provides a multispeed drive unit including: input means for receiving power from a power source, the input means disposed at an input side of the drive unit; output means for driving a driven unit, the output means disposed at an output side of the drive unit; transmission means for selectively toggling between a high-reduction configuration and a low-reduction configuration, the transmission means including a moveable gear interposed between the input means and the output means; means for fixing the moveable gear in the high-reduction configuration during operation of the multispeed drive unit, such that the transmission means is operable to reduce a speed of the output means relative to the input means; and means for fixing the moveable gear in the low-reduction configuration during operation of the multispeed drive unit, such that the transmission means is not operable to reduce the speed of the output means relative to the input means.

For example, the input means for receiving power may be an input shaft such as input shaft 27 shown in FIG. 2A, or may be an input gear such as sun gear 26 shown in FIG. 2A. Moreover, it is contemplated that any rotary input may be used to transmit power to a multispeed drive unit made in accordance with the present disclosure, as required or desired for a particular application. Moreover, it is contemplated that any rotary input may be used to transmit power to a multispeed drive unit made in accordance with the present disclosure, as required or desired for a particular application.

The output means for receiving power may be an output shaft such as output shaft 28 shown in FIG. 2A, or may be the output component of a planetary reduction mechanism. In the context of drive unit 10 described below, the output component of the illustrated planetary reduction mechanism is planet gear carrier 22, which is in turn rotationally fixed to output shaft 28. Moreover, it is contemplated that any rotary output may be used to drive a driven unit in accordance with the present disclosure, as required or desired for a particular application.

Transmission means for selectively toggling between a high-reduction configuration and a low-reduction configuration of the transmission means may be a planetary transmission arrangement, such as the planetary transmission of drive unit 10 including ring gear 20, gear carrier 22, planet gears 24 and sun gear 28 (as described in further detail below). In this exemplary embodiment, the selective toggling functionality of the transmission is provided by the axial movement (i.e., toward the input and/or output sides of drive unit 10) of ring gear 20, which engages or bypasses the gear-reduction functionality of the planetary system as described below.

Means for fixing the gear in a high-reduction configuration during operation of the multispeed drive may be outer clutch pack 40, which is operable to rotationally fix ring gear 20 to stationary housing 18 (FIG. 2A) as described below. When clutch pack 40 is engaged, ring gear 20 is effectively fixed with respect to the other stationary components of wheel drive 10, such that the other components of the planetary transmission system rotate within, and with respect to, ring gear 20. When these planetary components are allowed to so rotate, the planetary transmission operates to reduce the speed of output shaft 28 with respect to input shaft 27.

Means for fixing the gear in the low-reduction configuration during operation of the multispeed drive may be inner clutch pack 60, which is operable to rotationally fix ring gear 20 to planet gear carrier 22 (FIG. 3A) as described below. When clutch pack 40 is engaged, ring gear 20 is effectively constrained to rotate together with the other components of the planetary transmission system, including sun gear 26 and planet gear carrier 22. When these planetary components rotationally fixed to one another in this fashion, the planetary transmission does not operates to reduce the speed of output shaft 28 with respect to input shaft 27, instead directly transmitting torque from input shaft 27 (FIG. 2A) to output shaft 28.

In one aspect, the multispeed drive may include a biasing means for biasing the gear into one of the high-reduction configuration and the low-reduction configuration; and hydraulic means for selectively urging the moveable gear into the other of the high-reduction configuration and the low-reduction configuration, the hydraulic means operating against a biasing force provided by the biasing means.

For example, biasing means for biasing the gear may be springs 34, which bias ring gear 20 toward a high-reduction configuration as described in detail below. Hydraulic means for selectively urging ring gear 20 into the low-reduction configuration may be gearshift piston 12, which can move ring gear 20 toward the input side of drive unit 10 by filling fluid chamber 56 with pressurized fluid. As described in detail below, this pressurized fluid can be of sufficient pressure to overcome the opposing biasing force provided by springs 34.

In another aspect, the means for fixing the moveable gear in the high-reduction configuration and the means for fixing the moveable gear in the low-reduction configuration may each include means for frictionally rotationally fixing one component to another.

For example, outer and inner clutch packs 40, 60 (discussed above and described in detail below) may each be formed from a plurality of clutch plates 42, 44 and 62, 64 respectively. When plates 42, 44 or plates 62, 64 are urged into contact with one another, frictional interaction at the contact interface causes clutch pack 40 or 60 to effectively rotationally fix the plates to one another, and therefore to rotationally fix the components engaged by the plates to one another. In the case of outer clutch pack 40, clutch plates 42, 44 are rotationally fixed to stationary housing 18 and ring gear 20, respectively, which causes ring gear 20 to be rotationally fixed to housing 18 when plates 42, 44 are frictionally engaged. In the case of inner clutch pack 60, clutch plates 62, 64 are rotationally fixed to ring gear 20 and planet gear carrier 22, respectively, which causes ring gear 20 to be rotationally fixed to planet gear carrier 22 when plates 62, 64 are frictionally engaged.

BRIEF DESCRIPTION OF THE DRAWINGS

The above mentioned and other features and advantages of the present disclosure, and the manner of attaining them, will become more apparent and the invention itself will be better understood by reference to the following description of an embodiment of the invention taken in conjunction with the accompanying drawings, wherein:

FIG. 2A is a side, elevation, partial section view of the drive unit shown in FIG. 1B, in which a gearshift piston is shown in a non-actuated position;

FIG. 2B is an enlarged view of a portion of FIG. 2A, illustrating the non-actuated gearshift piston and associated clutch pack configurations corresponding to a high gear reduction configuration of the drive unit;

FIG. 3A is an elevation, partial section view of the drive unit shown in FIG. 2A, in which the gearshift piston of FIG. 2A has been toggled to an actuated position;

FIG. 3B is an enlarged view of a portion of the drive unit shown in FIG. 3A, illustrating the actuated gearshift piston and associated clutch pack configurations corresponding to a low gear reduction configuration of the drive unit;

FIG. 4A is a perspective view of an outer clutch pack made in accordance with the present disclosure, taken from the input end thereof;

FIG. 4D is another perspective view of the outer clutch pack and gearbox housing of FIG. 4C, shown with the ring gear of FIG. 4B coupled thereto, in which a portion of the ring gear is shown broken away for clarity;

FIG. 5A is a perspective view of an inner clutch pack made in accordance with the present disclosure, taken from the output end thereof;

FIG. 5B is another perspective view of the inner clutch pack shown in FIG. 5A, in which the inner clutch pack is shown assembled to the ring gear shown in FIGS. 4B and 4D, and to a gear carrier made in accordance with the present disclosure;

Corresponding reference characters indicate corresponding parts throughout the several views. The exemplification set out herein illustrates an exemplary embodiment of the invention, and such exemplification is not to be construed as limiting the scope of the invention in any manner.

DETAILED DESCRIPTION OF THE PRESENT INVENTION

Figure 2C:
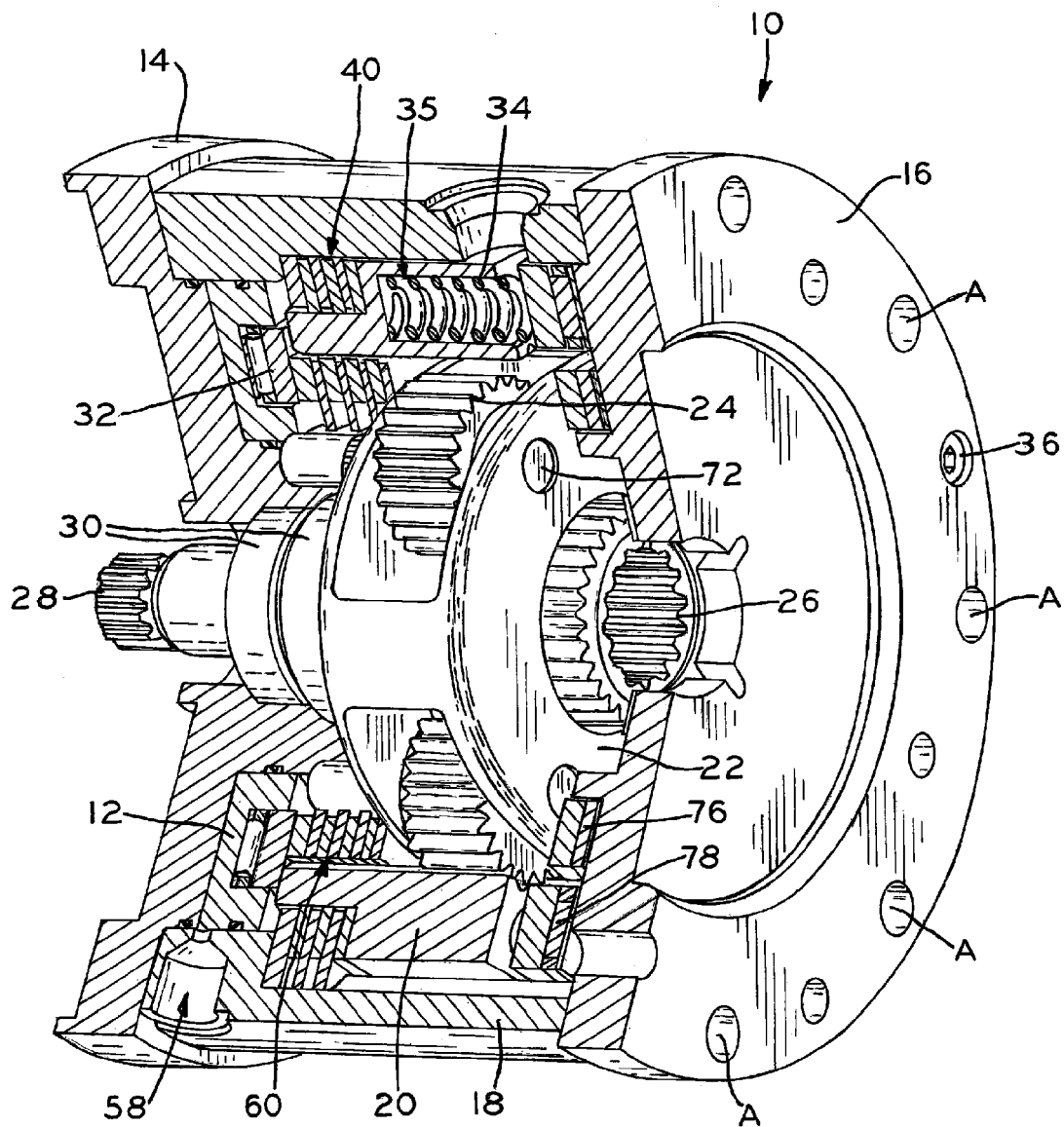
FIG. 2C is a perspective, partial section view of the drive unit shown in FIG. 2A, taken from the input end thereof.

The present disclosure provides two-speed drive unit 10 which toggles between two differing levels of gear reduction by actuation of a single gearshift piston 12. As described in detail below, gearshift piston 12 toggles between a high-reduction position (FIGS. 2A-2D) and a low-reduction position (FIGS. 3A-3D). In the high-reduction position, gearshift piston 12 causes outer clutch pack 40 to become operably engaged, thereby allowing a planetary gear system to operate inside drive unit 10 to provide a high gear reduction, i.e., output shaft 28 rotates substantially slower than input shaft 27 (FIG. 2A) coupled to the input sun gear 26. In the low-reduction position, gearshift piston 12 allows outer clutch pack 40 to become disengaged and causes clutch pack 60 to become operably engaged, thereby neutralizing the gear reduction functionality of the planetary gear system. Thus, in the low-reduction configuration, drive unit 10 provides no gear reduction, i.e., output shaft 28 rotates at the same speed as input shaft 27 (FIG. 2A) coupled to the input sun gear 26.

Turning now to FIG. 2A, drive unit 10 is shown in a cut-away, partial section view. The section of FIG. 2A is taken along line 1B-1B of FIG. 1A, but shows non-sectioned views of output shaft 28, bearings 30 and the components of a planetary transmission system including sun gear 26, planet gears 24 and planet gear carrier 22. Ring gear 20, which also participates in the operation of the planetary gear reduction system as described below, is shown in section. Several of the non-sectioned components in the view of FIG. 2A are shown protruding from the otherwise sectioned components of FIG. 1B.

Figure 1A:
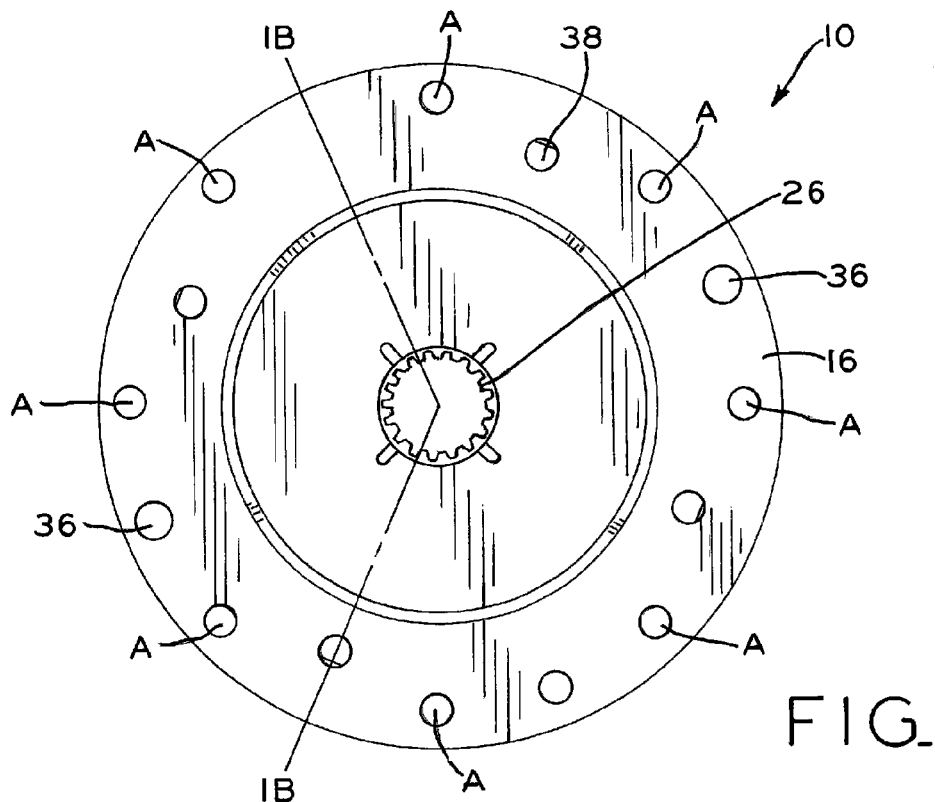
FIG. 1A is an input-end, elevation view of a drive unit in accordance with the present disclosure.
Figure 1B:
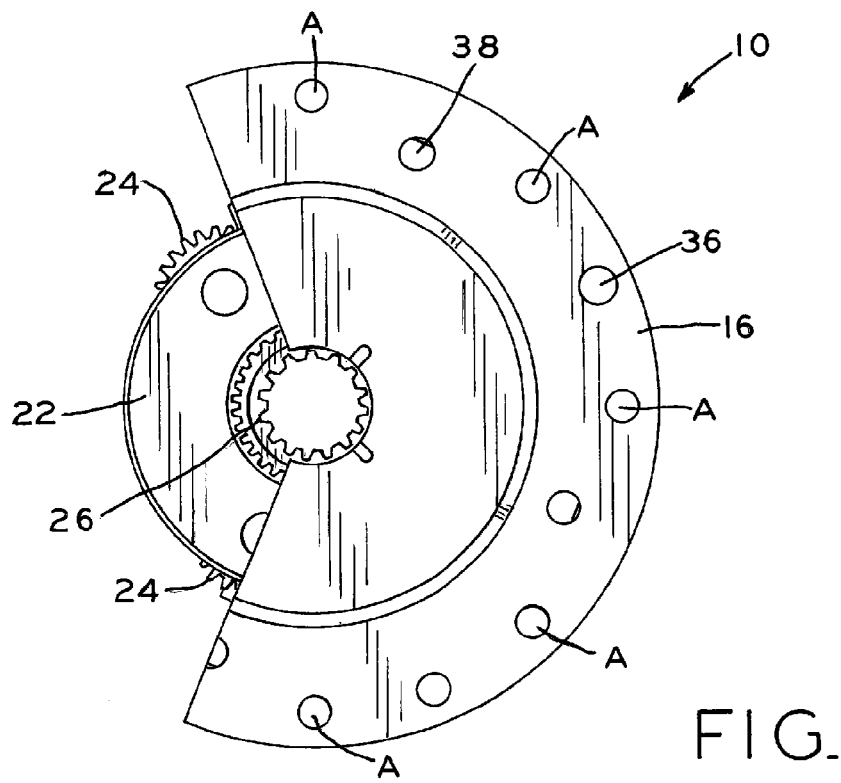
FIG. 1B is an input-end, elevation, partial section view of the drive unit shown in FIG. 1A, taken along line 1B-1B of FIG. 1A.
Figure 2D:
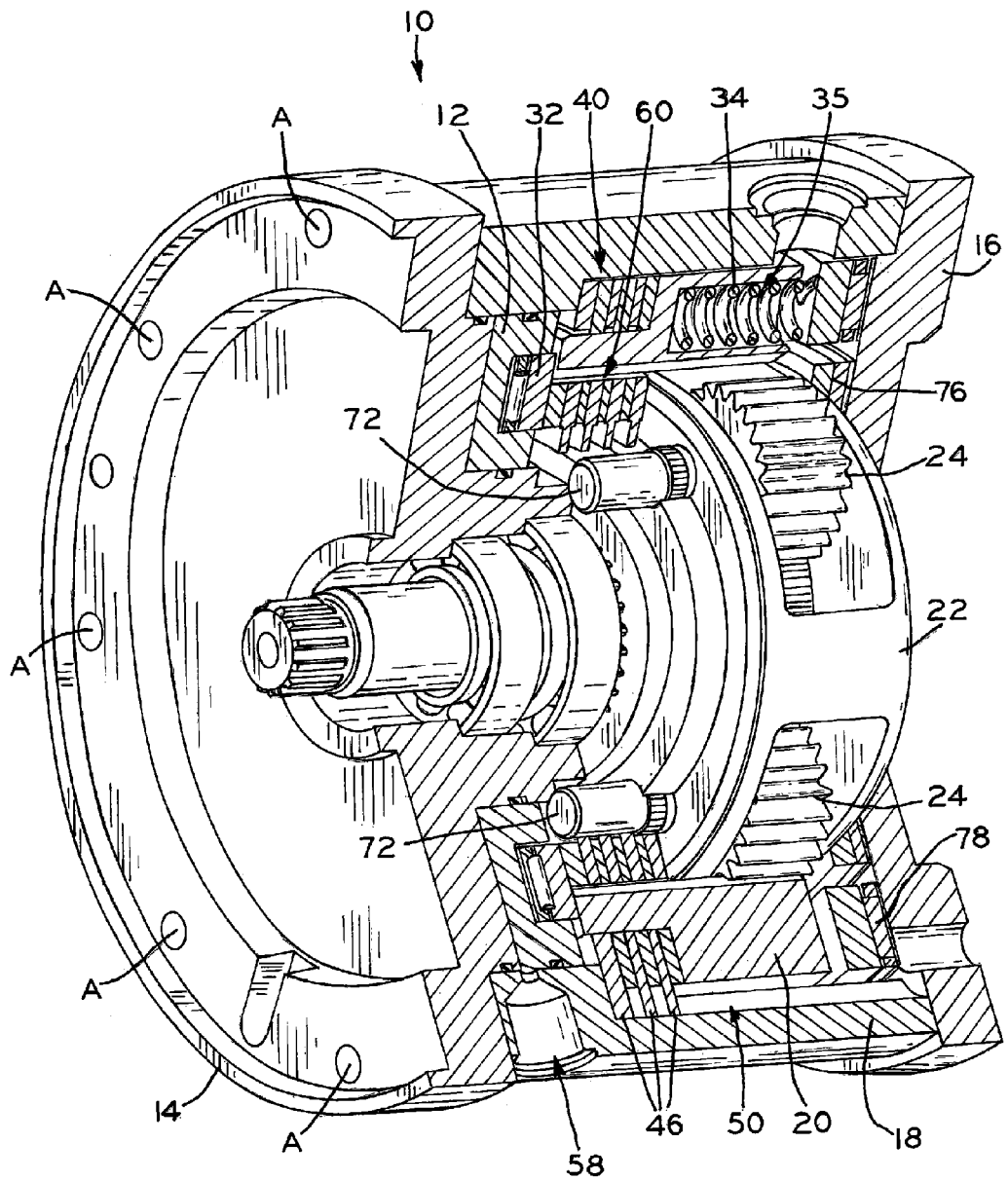
FIG. 2D is a perspective, partial section view of the drive unit shown in FIG. 2A, taken from the output end thereof.

Drive unit 10 includes input-side hub 16 and output-side hub 14 having gear box housing 18 disposed therebetween. Hubs 14, 16 and housing 18 are all affixed to one another, such as by housing bolts 36 (FIGS. 1A and 1B) passing through appropriately sized apertures A formed in output hub 14, input hub 16 and gear box housing 18 (FIGS. 2D, 1A and 4D, respectively). Output hub 14 mounts to a vehicle frame (not shown), secondary reduction box (not shown) or other mounting surface which is stationary with respect to the rotating driven unit (e.g., a vehicle wheel or auger drill bit) which receives power via drive unit 10. Input hub 16 may also be mounted to a vehicle frame member, adjacent to input shaft 27 (FIG. 2A) which is rotatably coupled to sun gear 26 and drives the driven unit.

For purposes of the present disclosure, input hub 16 is considered to be at an "input side" of drive unit 10, in that sun gear 26 receives power from an external or integral power source, such as a primary vehicle transmission, motor output shaft or the like. Conversely, output hub 14 is considered to be mounted at an "output side" of drive unit 10, in that power output is provided to a driven unit via output shaft 28 which is disposed just internally of output hub 14. As noted above, input shaft 27 may pass into the central aperture of input hub 16 to drivingly engage with the internal splines formed along the inner bore wall of sun gear 26.

Power is transmitted from input sun gear 26 to output shaft 28 via a planetary transmission assembly, as shown in FIG. 2A. As described in detail below, drive unit 10 can selectively engage and disengage the planetary transmission assembly to provide a variable gear reduction. When the planetary transmission assembly is engaged and operating, input sun gear 26 drives output shaft 28 via the gear reduction mechanism of the planetary transmission assembly.

More particularly, planet gear carrier 22 directly drives rotation of output shaft 28 by being rotatably fixed therewith, such as via a geared shaft end in intermeshed engagement with internal gear teeth of planet gear carrier 22 as shown in FIGS. 2A and 2D. Planet gear carrier 22 is rotatably coupled with each of a plurality of planet gears 24, such as three planet gears 24 as shown in the drawings, such that planet gears 24 can rotate about their respective gear axles independently of gear carrier 22. In the illustrated embodiment, pins 72 provide the axles for this independent rotation. The outer gear teeth of planet gears 24 are intermeshed with both inner gear teeth of ring gear 20 (near the outer periphery of gear carrier 22) and with outer gear teeth of sun gear 26 (disposed within the central bore of gear carrier 22).

When the planetary transmission assembly is operational (i.e., when drive unit 10 is in the high-reduction configuration as described below), ring gear 20 is fixed with respect to gear box housing 18 (also described in detail below) and therefore may be considered to be "stationary" in the context of drive unit 10. Therefore, as sun gear 26 rotates under the influence of the external or integral power source, planet gears 24 circumnavigate sun gear 26 while the gear teeth of planet gears 24 remain in intermeshing engagement with both ring gear 20 and sun gear 26, in turn causing gear carrier 22 to also rotate. As planet gears 24 circumnavigate sun gear 26, gear carrier 22 rotates at a slower rotational speed than the rotational speed of input sun gear 26, thereby driving output shaft 28 at the same reduced rotational output speed. In an exemplary embodiment, for example, the rotational speed of input sun gear 26 may be between 2 and 10 times faster than the corresponding rotational speed of output shaft 28.

As noted above, drive unit 10 can be toggled between high-reduction and low-reduction configurations by selectively engaging one of outer and inner clutch packs 40, 60. Clutch packs 40, 60 are referred to herein as "outer" and "inner" clutch pack owing to their relative radial locations, i.e., radially outward or radially inward. Selective engagement of clutch packs 40, 60 is accomplished by selectively pressurizing or depressurizing fluid chamber 56, as described in detail below.

Turning to FIGS. 2A-2D, drive unit 10 is shown in a high-reduction configuration, in which inner clutch pack 60 is disengaged and outer clutch pack 40 is engaged. The high-reduction configuration results from a lack of sufficiently pressurized fluid within fluid chamber 56 (FIGS. 2A and 2B), which allows springs 34 to bias ring gear 20 toward the output side of drive unit 10, i.e., toward the left as shown FIGS. 2A through 2D. More particularly, referring to FIG. 2B, ring gear 20 includes shoulder 21A positioned to abut thrust bearing 32 contained within gearshift piston 12. Thrust bearing 32 also abuts inner clutch plate 62 disposed at the output side of inner clutch pack 60, thereby serving to engage inner clutch pack 60 as described in detail below with respect to the low-reduction configuration of drive unit 10.

In the high-reduction configuration of FIG. 2B, clutch relief space 74 is made available to allow inner clutch plates 62, 64 of inner clutch pack 60 to spread apart from one another in the space between thrust bearing 32 and gear carrier 22. The spreading apart of clutch plates 62, 64 prevents substantial frictional interaction therebetween, thereby rendering inner clutch pack 60 disengaged.

Meanwhile, shoulder 21B of ring gear 20 abuts clutch plate 44 disposed at the input side of clutch pack 40. The leftward bias of ring gear 20 provided by springs 34 (FIG. 2A) creates pressure on and between clutch plates 42, 44 of outer clutch pack 40, squeezing plates 42, 44 together between shoulder 21B of ring gear 20 and shoulder 19 of gear box housing 18. This squeezing action provided by springs 34 occurs when fluid chamber 56 is not significantly pressurized, as described below, thereby allowing springs 34 to forcefully urge clutch plates 42, 44 toward one another. When so squeezed, frictional interaction between clutch plates 42, 44 causes clutch plates 42, 44 to be effectively rotationally fixed to one another, thereby placing outer clutch pack 40 into an engaged configuration in which clutch pack 40 rotationally fixes ring gear 20 to housing 18. As described in detail below, this torque transmission effectively rotationally immobilizes ring gear 20 and enables the planetary transmission system to operate as a gear-reducing unit.

Outer clutch pack 40 is shown isolated from the remainder of drive unit 10 in FIG. 4A. As illustrated, outer clutch pack 40 includes a plurality of alternating clutch plates 42, 44, though it is appreciated that any number of clutch plates 42, 44 could be used (including a single pair). Clutch plates 42, 44 are made of materials which have a high frictional interaction with one another, thereby enabling large transfers of torque therebetween when the plates are squeezed together as described above.

Figure 4B:
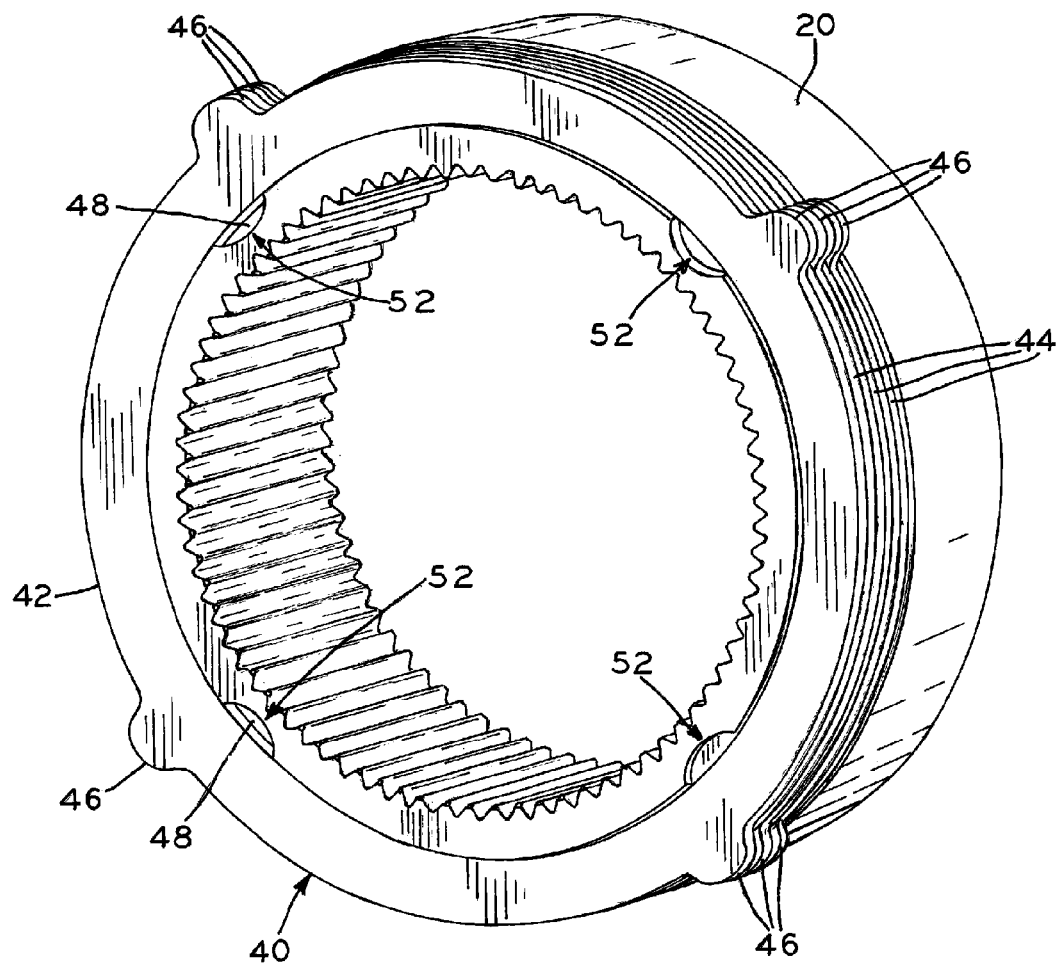
FIG. 4B is a perspective view of the outer clutch pack shown in FIG. 4A, taken from the output end thereof, and illustrating the outer clutch pack mounted to a ring gear made in accordance with the present disclosure.
Figure 4C:
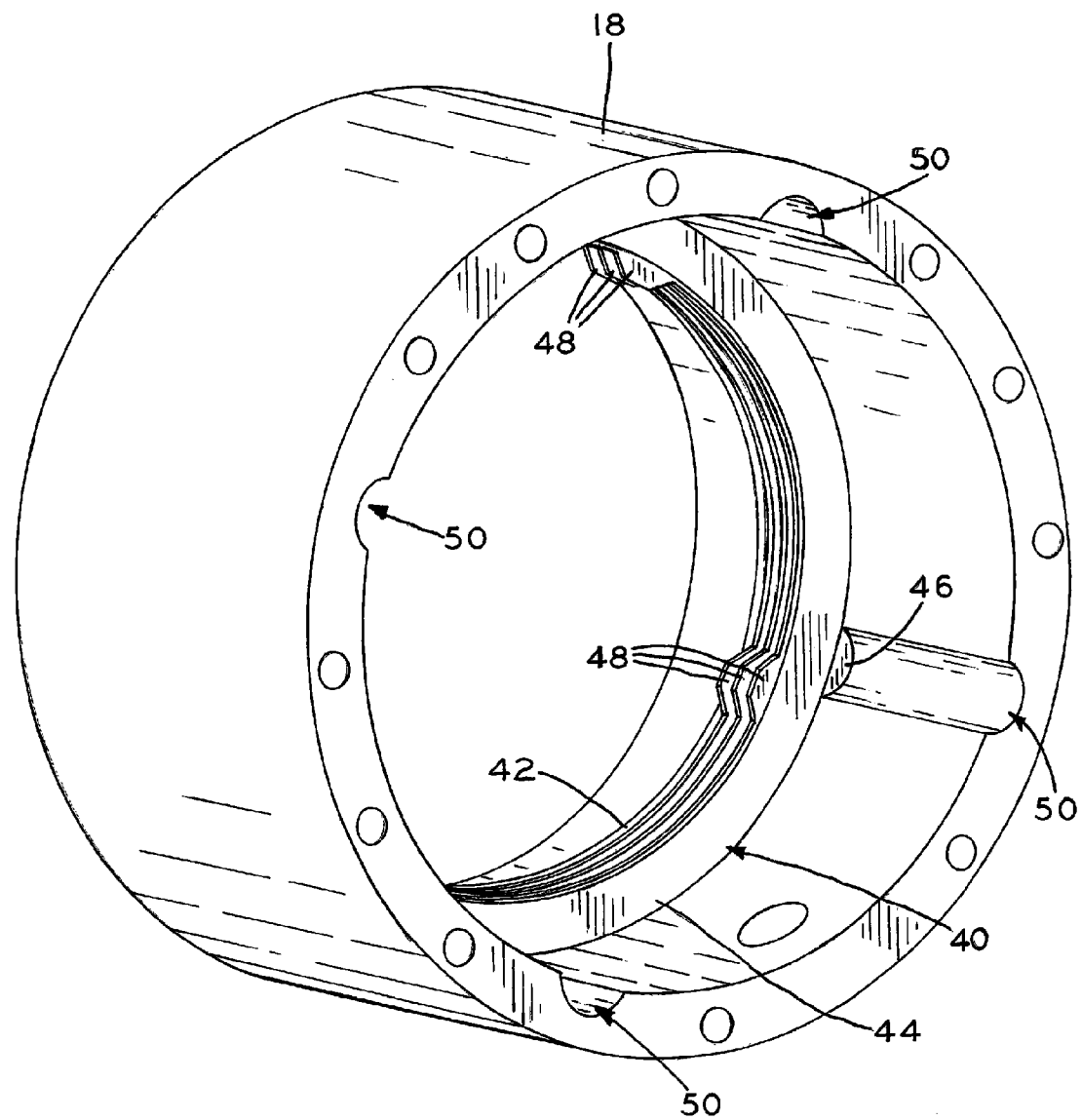
FIG. 4C is another perspective view of the outer clutch pack shown in FIG. 4A, illustrating the outer clutch pack mounted within a gearbox housing made in accordance with the present disclosure.

Clutch plates 42 include outer lugs 46 sized to be received within corresponding recesses 50 formed in an inner surface of gear box housing 18 (FIGS. 2B and 4C). As shown in FIG. 4C, clutch plates 42 are rotationally fixed with respect to gear box housing 18 when assembled thereto by interaction between outer lugs 46 and recesses 50. Similarly, as best seen in FIG. 4B, clutch plates 44 include inner lugs 48 sized to be received within recesses 52 formed in an outer surface of ring gear 20. Thus, outer clutch plates 44 are rotationally fixed with respect to ring gear 20 when assembled thereto by interaction between inner lugs 48 and recesses 52.

As illustrated in FIGS. 2B and 4D, clutch plates 42, 44 of outer clutch pack 40 are disposed between ring gear 20 and gear box housing 18 upon assembly. When ring gear 20 is allowed to be biased toward the output side of drive unit 10 by the biasing force provided by springs 34, the frictional interaction between clutch plates 42, 44 rotationally fixes ring gear 20 to gear box housing 18. In effect, this rotational fixation renders ring gear 20 stationary with respect to the other movable parts of drive unit 10, including the other parts of the planetary transmission assembly. Conversely, as described in detail below, movement of ring gear 20 toward the input side (i.e., toward the right as illustrated in the figures) creates space between respective pairs of clutch plates 42, 44, thereby freeing ring gear 20 to rotate with respect to gear box housing 18.

When outer clutch pack 40 in engaged and ring gear 20 is stationary, the planetary transmission mechanism operates to create gear reduction between input sun gear 26 and output shaft 28, as noted above. More particularly, torque transmission from sun gear 26 to output shaft 28 occurs via the planetary transmission system, which effects the gear reduction by the independent rotation of planet gears 24 and their attendant circumnavigation around sun gear 26, as described above.

Therefore, drive unit 10 provides a high gear reduction when fluid chamber 56 is non-pressurized, such that springs 34 engage outer clutch pack 40 and immobilize ring gear 20, in turn enabling the planetary transmission system to function as a gear reducing unit.

Figure 3C:
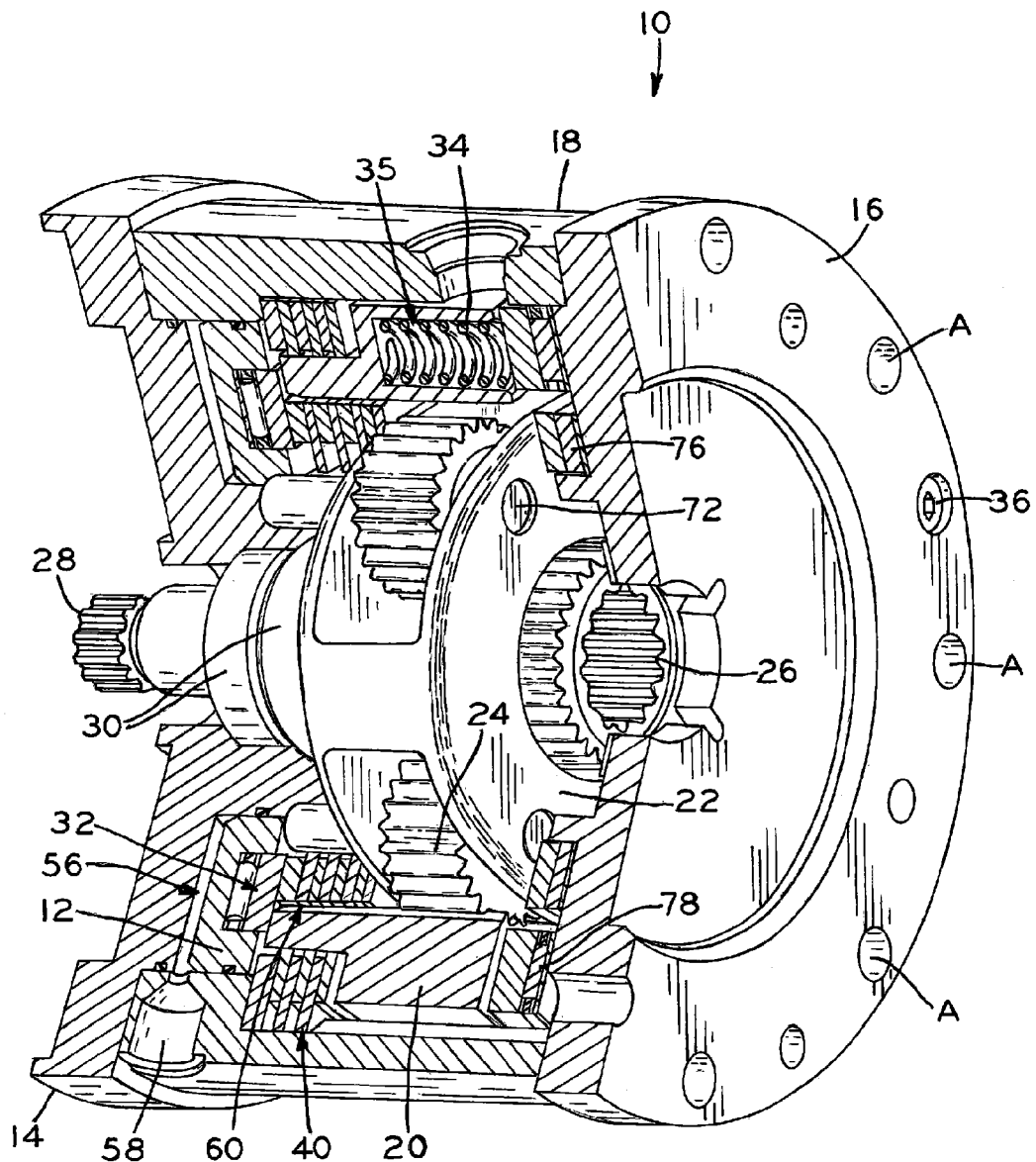
FIG. 3C is a perspective, partial section view of the drive unit shown in FIG. 3A, taken from the input end thereof.
Figure 3D:
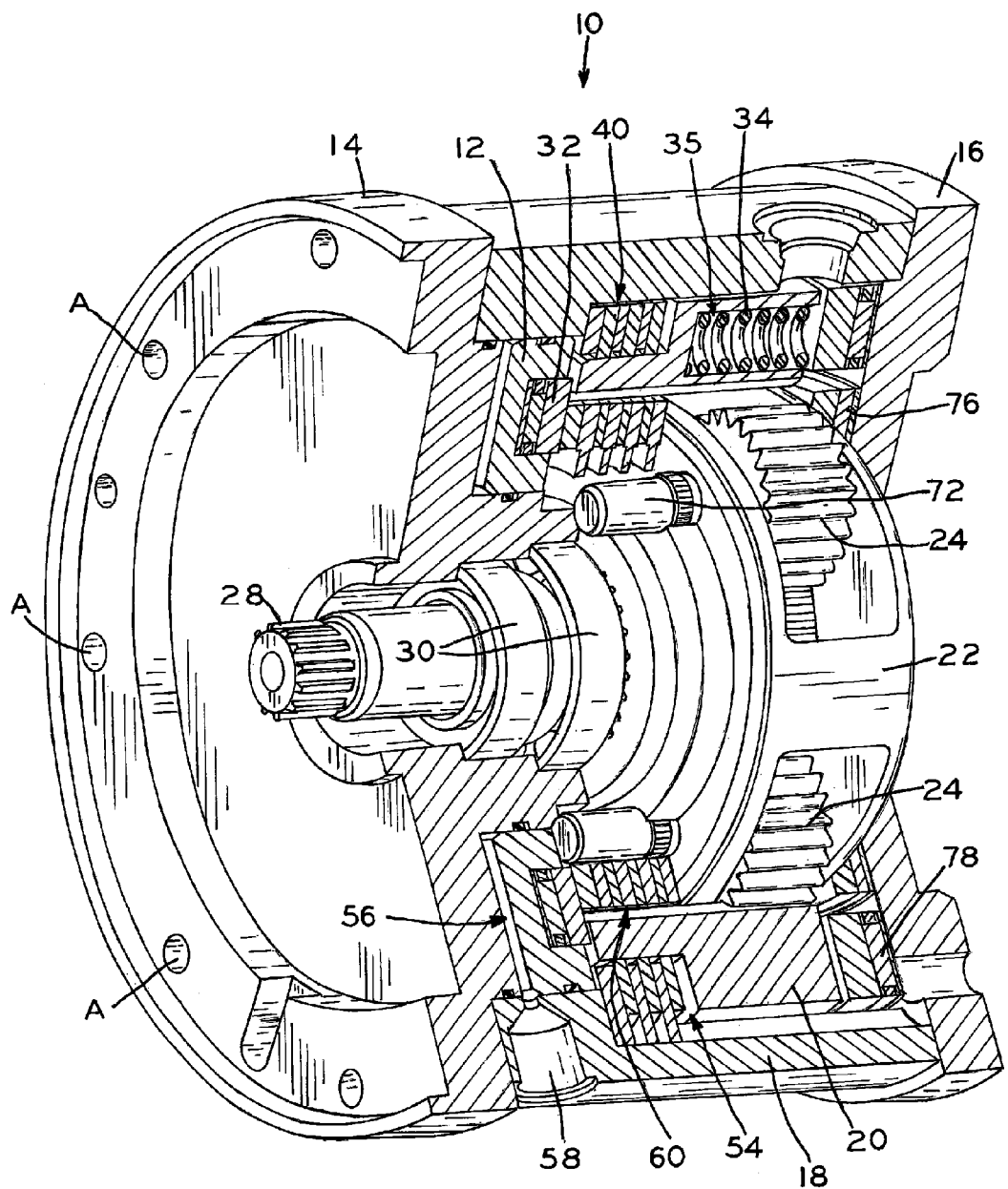
FIG. 3D is a perspective, partial section view of the drive unit shown in FIG. 3A, taken from the output end thereof.

By contrast, drive unit 10 is shown in a low-reduction configuration in FIGS. 3A-3D. To configure drive unit 10 into the low-reduction configuration, pressurized fluid is delivered to fluid chamber 56 via fluid inlet 58, which urges gearshift piston 12 and thrust bearing 32 toward the input end of drive unit 10 (i.e., to the right as shown in the FIGS. 3A-3D). As best seen in FIG. 3B, thrust bearing 32 is positioned to contact both ring gear 20 and inner clutch pack 60, while both gearshift piston 12 and thrust bearing 32 remain spaced away from outer clutch pack 40. As described below, this configuration allows simultaneous engagement of inner clutch pack 60 and disengagement of outer clutch pack 40.

When sufficient fluid pressure builds up within chamber 56, the force on gearshift piston 12 causes thrust bearing 32 to overcome the biasing force of springs 34 and shift ring gear 20 toward the input end of drive unit 10 while compressing springs 34. As ring gear 20 moves, clutch relief space 54 (FIGS. 3A and 3B) opens up between shoulder 21B of ring gear 20 and shoulder 19 of gear box housing 18. Clutch relief space 54 allows outer clutch plates 42, 44 to spread apart from one another, thereby rotationally decoupling ring gear 20 from gear box housing 18. Thus, ring gear 20 becomes free to rotate with respect to gear box housing 18. In an exemplary embodiment, the number and spring rates of springs 34 are chosen such that clutch relief space 54 begins to open upon application of 200 pounds per square inch (psi) of pressure within fluid chamber 56. The fluid utilized for creating this pressure may be hydraulic fluid, for example. In the illustrative embodiment shown in FIG. 4D, for example, twenty blind bores 35 are formed in ring gear 20 to receive and capture twenty springs 34 (it being understood that six of the twenty bores are not shown in the broken-away portion of ring gear 20).

Figure 6:
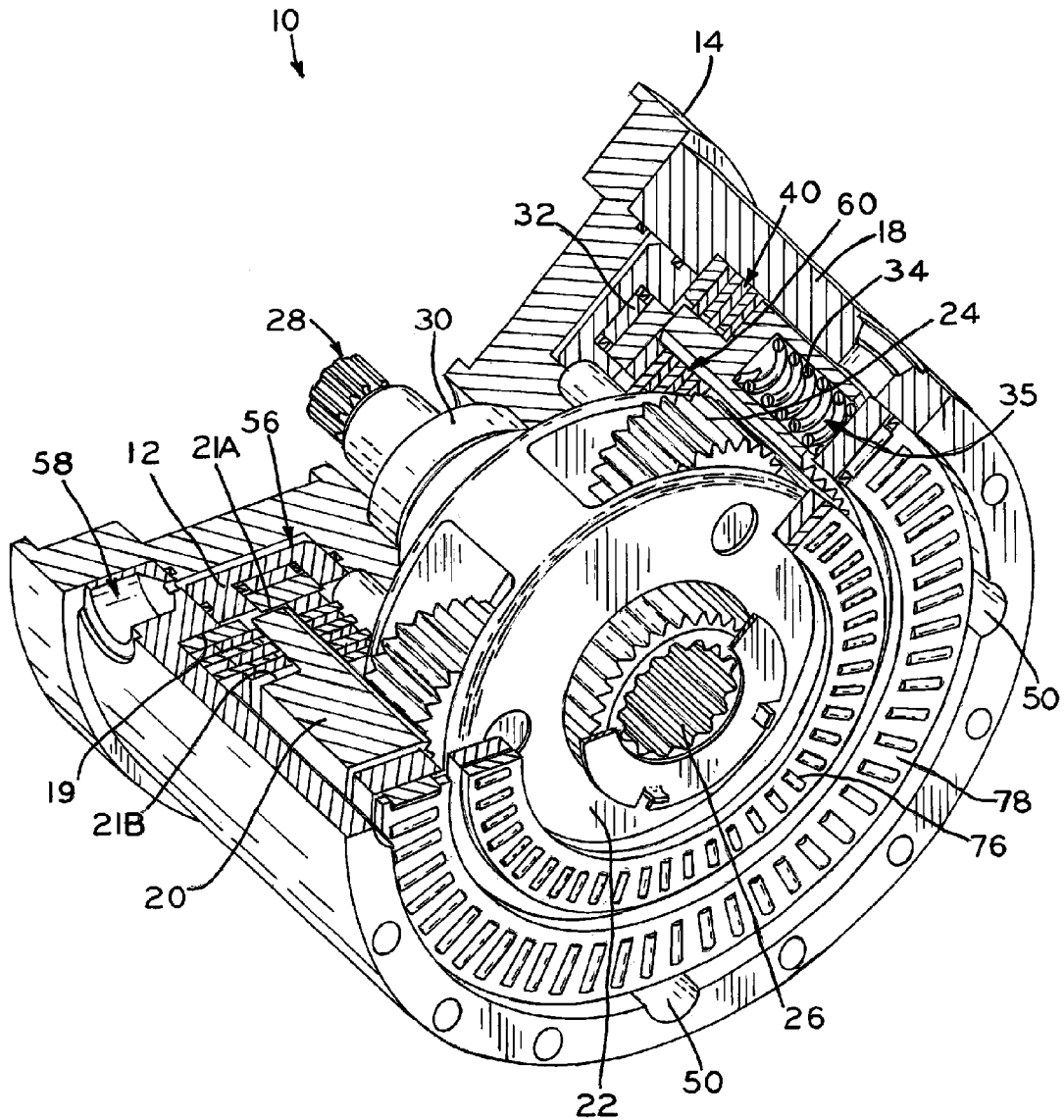
FIG. 6 is a perspective, partial section view of the drive unit shown in FIG. 1B, taken from the input end thereof, in which the input hub of the drive unit has been removed to illustrate internal components of the drive unit.
Figure 7:
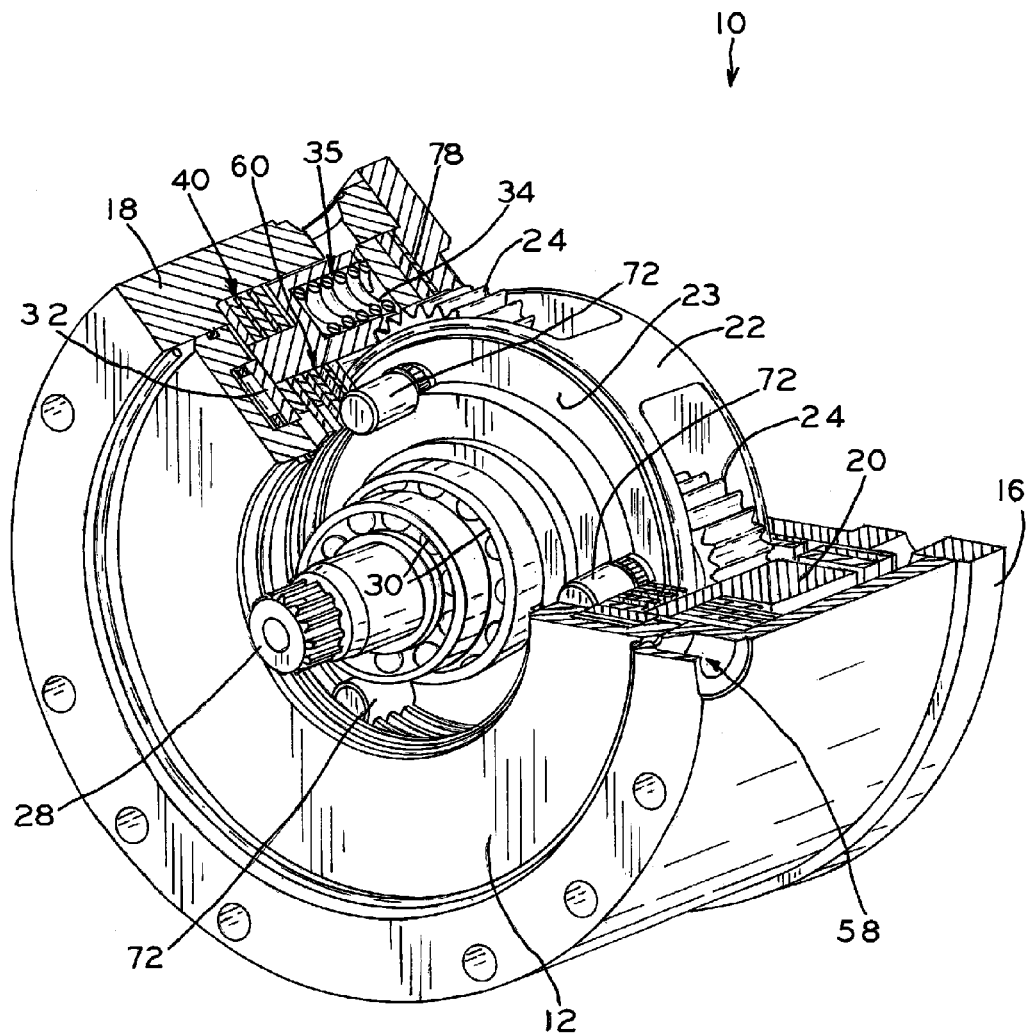
FIG. 7 is a perspective, partial section view of the drive unit shown in FIG. 1B, taken from the output end thereof, in which the output hub of the drive unit has been removed to illustrate internal components of the drive unit.

As noted above, thrust bearing 32 acts on both ring gear 20 and inner clutch pack 60, so that as clutch relief space 54 opens, clutch relief space 74 between gear carrier 22 and thrust bearing 32 (FIGS. 2A and 2B) closes. Thus, the alternating inner clutch plates 62, 64 of inner clutch pack 60 become squeezed between thrust bearing 32 and shoulder 23 of gear carrier 22. Thus, as fluid pressure increases within chamber 56, clutch plates 62, 64 are squeezed together with increasing force, thereby increasing the frictional interaction between plates 62, 64 such that inner clutch pack 60 rotates as a single unit as torque is transferred across clutch plates 62, 64. Thrust bearing 32 provides a low-friction interface between the output-side clutch plate 62 of inner clutch pack 60 and piston 12, to facilitate rotation therebetween when clutch pack 60 is engaged. At the input-side surfaces of ring gear 20 and gear carrier 22, outer and inner input-side thrust bearings 78, 76 (FIG. 6) may be provided to facilitate smooth rotation in a similar fashion.

Turning to FIG. 5A, inner clutch pack 60 is shown isolated from the remainder of drive unit 10. As illustrated, clutch plates 62 each include a plurality of gear teeth 66 protruding radially outwardly from the outer periphery clutch plates 62. As shown in FIG. 5B, gear teeth 66 engage correspondingly shaped gear teeth formed in the inner bore of ring gear 20, thereby rotationally fixing inner clutch plates 62 to ring gear 20 upon assembly. Similarly, inner clutch plates 64 include recesses 68 protruding radially outwardly from the inner periphery thereof. As shown in FIG. 5B, recesses 68 of clutch plates 64 are alignable with corresponding recesses 70 protruding radially inwardly from the outer periphery of gear carrier 22, such that coupling pins 72 may be inserted into each adjacent pair of recesses 68, 70 to rotationally fix inner clutch plates 64 to gear carrier 22 as illustrated in FIG. 5B.

When inner clutch pack 60 is in an engaged configuration as shown in FIGS. 3A and 3B, the frictional interaction between clutch plates 62, 64 transfers torque from ring gear 20 (free to rotate with respect to gearbox housing 18, owing to the creation of clutch relief space 54 as noted above) to gear carrier 22 (which directly drives output shaft 28 as noted above). Thus, when sufficient pressure is applied to inner clutch pack 60 to squeeze clutch plates 62, 64 together, gear carrier 22 becomes rotationally fixed to ring gear 20 such that gear carrier 22 and ring gear 20 both rotate at the speed of input sun gear 26.

When in the low-reduction configuration of FIGS. 3A-3D, sun gear 26 also rotates at the same speed as output shaft 28, rather than rotating faster as is the case in the high-reduction configuration described above. In effect, the planetary transmission system ceases to operate as a gear reduction unit and instead serves to transmit torque from sun gear 26 to output shaft 28 without gear reduction. More particularly, the common rotation of ring gear 20 and gear carrier 22 prevents rotation of planet gears 24 about their respective pins 72, because such rotation requires relative rotation of gear carrier 22 with respect to ring gear 20. Thus, engagement of inner clutch pack 60 (and the concomitant rotational fixation of ring gear 20 to gear carrier 22) converts planet gears 24 from their circumnavigating, gear-reducing function (described above) into direct transmitters of torque from sun gear 26 to ring gear 20.

Stated another way, planet gears 24 cease to circumnavigate sun gear 26 when gear carrier 22 is rotationally fixed to ring gear 20. Instead, planet gears 24 remain rotationally fixed with respect to sun gear 26 by virtue of the engagement of intermeshing gear teeth between the outer gear teeth of planet gears 24 and the adjacent outer and inner gear teeth of sun gear 26 and ring gear 20 respectively. Thus ring gear 20, gear carrier 22, planet gears 24 and sun gear 26 remain statically engaged with one another, all rotating as a single unit under the influence of power transmitted thereto from sun gear 26. In this way, engagement of inner clutch pack 60 (and the concomitant disengagement of outer clutch pack 40) effectively converts drive unit 10 from a high reduction transmission unit into a 1:1 transmission with no gear reduction.

As noted above, the amount of fluid pressure within fluid chamber 56 dictates the amount of torque transmissible through inner clutch pack 60, because increased fluid pressure squeezes plates 62, 64 together with greater force and thereby increases the frictional interaction therebetween. In the exemplary embodiment described above in which fluid pressure of 200 psi causes gearshift piston 12 to overcome the biasing force of springs 34 and begin to move, an additional pressure of between 200 psi and 500 psi applied within fluid chamber 56 (for a total of 400-700 psi) may be applied to ensure firm engagement of inner clutch pack 60 and avoid slippage between adjacent pairs of clutch plates 62, 64.

Thus, drive unit 10 provides a single-piston, hydraulically actuated two speed transmission. However, it is contemplated that certain modifications may be made to the exemplary embodiment shown in the appended figures and described above, while remaining within the scope of the present disclosure. For example, gearshift piston 12 may be mechanically actuated rather than fluid-powered. More than two discreet gear reductions may be provided by utilizing additional iterations of the single piston design within a common drive unit.

The present single piston design, utilizing movement of a single monolithic part (namely, ring gear 20) in order to effect a change in gear reduction, allows a change in gear reductions to be made remotely and/or automatically. Further, the single-piston design provides this remote-operable, multi-speed functionality with minimal of cost and complexity in the drive unit and its surrounding infrastructure.

Moreover, a single piston design in accordance with the present disclosure may be considered a functionally "binary" system, in that the system defines only two potential states. In the "on" or actuated state, gearshift piston 12 overcomes the biasing force of springs 34 to provide low gear reduction and a relatively higher output speed, as described in detail above. In the "off" or non-actuated state, gearshift piston 12 is functionally absent from the operation of drive unit 10, and springs 34 are allowed to configure drive unit 10 into a high-reduction arrangement for a relatively lower output speed of output shaft 28.

Advantageously, this binary operation of drive unit 10 allows gearshift piston 12 to be toggled remotely using a minimum of fluid power control devices, such as a single on/off solenoid which selectively injects pressurized fluid into chamber 56 via fluid inlet 58. Further, the use of outer and inner clutch packs 40, 60 facilitates toggling of drive unit 10 between high-reduction and low-reduction configurations without pausing the operation of drive unit 10. To accommodate this "shift on the fly" functionality, clutch plates 42, 44, 62, 64 may be adapted to allow limited slippage therebetween during the shifting process. For example, outer and inner clutch packs 40, 60 may be of a "wet clutch" design which bathes clutch plates 42, 44, 62, 64 in lubricating fluid to facilitate repeated, limited slipping as drive unit 10 is shifted between high-reduction and low-reduction configurations without disrupting the application of power to output shaft 28. To facilitate this "wet clutch" functionality, transmission fluid may be introduced into the drive unit 10 via fluid port 38 formed in input hub 16 (FIGS. 1A and 1B).

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multispeed drive unit comprising:
   a rotary input positioned to be driven by a power source and disposed at an input side of the drive unit;
   a rotary output positioned to drive a driven unit and disposed at an output side of the drive unit;
   a planetary transmission assembly operably interposed between said rotary input and said rotary output, said planetary transmission assembly comprising:
      a sun gear having sun gear teeth formed on an outer surface thereof;
      at least one planet gear having planet gear teeth formed on an outer surface of said planet gear, said planet gear teeth intermeshingly engageable with said sun gear teeth such that rotation of said sun gear is capable of rotating said at least one planet gear;
      a planet gear carrier rotatably supporting said at least one planet gear, such that said at least one planet gear is independently rotatable with respect to said planet gear carrier; and
      a ring gear comprising ring gear teeth formed on an inner surface of said ring gear, said ring gear teeth intermeshingly engageable with said planet gear teeth, said planet gear disposed between said ring gear and said sun gear such that torque is transmissible from said sun gear to said planet gear carrier via said planet gear,
      said ring gear selectively configurable into a high-reduction configuration and a low-reduction configuration by moving said ring gear toward one of the input side of the drive unit and the output side of the drive unit;
   a housing interposed between the input side and the output side, said housing stationary with respect to said planetary transmission assembly;
   a first clutch pack comprising:
      a first clutch plate rotatably fixed to an outer surface of said ring gear; and
      a second clutch plate rotatably fixed to an inner surface of said housing,
      said second clutch plate engageable with said first clutch plate to rotatably fix said ring gear to said housing when said ring gear is in said high-reduction configuration, said planetary transmission assembly operable to reduce a speed of said rotary output relative to said rotary input when said first and second clutch plates are engaged; and
   a second clutch pack comprising:
      a third clutch plate rotatably fixed to said inner surface of said ring gear; and
      a fourth clutch plate rotatably fixed to said planet gear carrier,
      said third clutch plate engageable with said fourth clutch plate to rotatably fix said ring gear to said planet gear carrier when said ring gear is in said low-reduction configuration, said planetary transmission assembly rotating as a single unit when said third and fourth clutch plates are engaged.

2. The multispeed drive unit of claim 1, further comprising:
   a biasing element urging said first and second clutch plates into engagement with one another, whereby said biasing element urges said ring gear into said high-reduction configuration; and
   a gearshift piston moveable between an actuated position and a non-actuated position, said gearshift piston allowing said first and second clutch plates to engage when in said non-actuated position, said gearshift piston urging said second clutch pack into engagement when in said actuated position, whereby said gearshift piston cooperates to toggle said ring gear between said high-reduction configuration and said-low reduction configuration.

3. The multispeed drive unit of claim 2, further comprising a fluid inlet leading to a fluid chamber, said gearshift piston urged into said actuated position when pressurized fluid is received in said fluid chamber.

4. The multispeed drive unit of claim 2, wherein said biasing element acts on said ring gear such that a shoulder of said ring gear is positioned to abut one of said first clutch plate and said second clutch plate to engage with the other of said first clutch plate and said second clutch plate when said gearshift piston is in the non-actuated position.

5. The multispeed drive unit of claim 2, further comprising a low-friction interface between one of said third and fourth clutch plates and said gearshift piston, whereby rotation therebetween is facilitated when said second clutch pack is engaged.

6. The multispeed drive unit of claim 1, wherein said first clutch pack is disposed radially outwardly of said second clutch pack, whereby said first clutch pack comprises an outer clutch pack and said second clutch pack comprises an inner clutch pack.

7. The multispeed drive unit of claim 1, wherein said at least one planet gear circumnavigates said sun gear when said ring gear is in said high-reduction configuration, and said ring gear rotates at the same speed as with said sun gear when said ring gear is in said low-reduction configuration.

8. The multispeed drive unit of claim 1, wherein:
   said ring gear is acted upon by an actuator which urges said ring gear into one of said low-reduction configuration and said high-reduction configuration when said actuator is actuated; and
   said ring gear is acted upon by a biasing element which urges said ring gear into the other of said low-reduction configuration and said high-reduction configuration when said actuator is not actuated.

9. The multispeed drive unit of claim 8, wherein:
   said actuator is configured to cause engagement of said second clutch pack while simultaneously allowing said first clutch pack to disengage when said actuator is actuated; and
   said biasing element is configured to cause engagement of said first clutch pack while simultaneously allowing said second clutch pack to disengage when said actuator is not actuated.

10. The multispeed drive unit of claim 8, wherein said actuator comprises a hydraulic actuator.

11. The multispeed drive unit of claim 1, wherein said rotary input rotates at between 2 and 10 times faster than said rotary output when said ring gear is in said high-reduction configuration.

12. A multispeed drive unit comprising:
   a rotary input positioned to be driven by a power source and disposed at an input side of the drive unit;
   a rotary output positioned to drive a driven unit and disposed at an output side of the drive unit;
   a planetary transmission assembly operably interposed between said rotary input and said rotary output, said planetary transmission assembly comprising:
      a sun gear having sun gear teeth formed on an outer surface thereof;
      at least one planet gear having planet gear teeth formed on an outer surface of said planet gear, said planet gear teeth intermeshingly engageable with said sun gear teeth such that rotation of said sun gear is capable of rotating said at least one planet gear;
      a planet gear carrier rotatably supporting said at least one planet gear, such that said at least one planet gear is independently rotatable with respect to said planet gear carrier; and
      a ring gear comprising ring gear teeth formed on an inner surface of said ring gear, said ring gear teeth intermeshingly engageable with said planet gear teeth, said planet gear disposed between said ring gear and said sun gear such that torque is transmissible from said sun gear to said planet gear carrier via said planet gear,
      said ring gear selectively configurable into a high-reduction configuration and a low-reduction configuration by moving said ring gear toward one of the input side of the drive unit and the output side of the drive unit;
   a housing interposed between the input side and the output side, said housing stationary with respect to said planetary transmission assembly;
   a first clutch comprising:
      a first clutch portion rotatably fixed to an outer surface of said ring gear; and
      a second clutch portion rotatably fixed to an inner surface of said housing,
      said second clutch portion engageable with said first clutch portion to rotatably fix said ring gear to said housing when said ring gear is in said high-reduction configuration, said planetary transmission assembly operable to reduce a speed of said rotary output relative to said rotary input when said first and second clutch portions are engaged; and
   a second clutch comprising:
      a third clutch portion rotatably fixed to said inner surface of said ring gear; and
      a fourth clutch portion rotatably fixed to said planet gear carrier,
      said third clutch portion engageable with said fourth clutch portion to rotatably fix said ring gear to said planet gear carrier when said ring gear is in said low-reduction configuration, said planetary transmission assembly rotating as a single unit when said third and fourth clutch portions are engaged.

13. The multispeed drive unit of claim 12, further comprising:
   a biasing element urging said first and second clutch portions into engagement with one another, whereby said biasing element urges said ring gear into said high-reduction configuration; and
   a gearshift piston moveable between an actuated position and a non-actuated position, said gearshift piston allowing said first and second clutch portions to engage when in said non-actuated position, said gearshift piston urging said second clutch into engagement when in said actuated position, whereby said gearshift piston cooperates to toggle said ring gear between said high-reduction configuration and said-low reduction configuration.

14. The multispeed drive unit of claim 13, further comprising a fluid inlet leading to a fluid chamber, said gearshift piston urged into said actuated position when pressurized fluid is received in said fluid chamber.

15. The multispeed drive unit of claim 13, wherein said biasing element acts on said ring gear such that a shoulder of said ring gear is positioned to abut one of said first clutch portion and said second clutch portion to engage with the other of said first clutch portion and said second clutch portion when said gearshift piston is in the non-actuated position.

16. The multispeed drive unit of claim 13, further comprising a low-friction interface between one of said third and fourth clutch portions and said gearshift piston, whereby rotation therebetween is facilitated when said second clutch is engaged.

17. The multispeed drive unit of claim 12, wherein said first clutch is disposed radially outwardly of said second clutch, whereby said first clutch comprises an outer clutch and said second clutch comprises an inner clutch.

18. The multispeed drive unit of claim 12, wherein said at least one planet gear circumnavigates said sun gear when said ring gear is in said high-reduction configuration, and said ring gear rotates at the same speed as with said sun gear when said ring gear is in said low-reduction configuration.

19. The multispeed drive unit of claim 12, wherein:
   said ring gear is acted upon by an actuator which urges said ring gear into one of said low-reduction configuration and said high-reduction configuration when said actuator is actuated; and
   said ring gear is acted upon by a biasing element which urges said ring gear into the other of said low-reduction configuration and said high-reduction configuration when said actuator is not actuated.

20. The multispeed drive unit of claim 19, wherein:
   said actuator is configured to cause engagement of said second clutch while simultaneously allowing said first clutch to disengage when said actuator is actuated; and
   said biasing element is configured to cause engagement of said first clutch while simultaneously allowing said second clutch to disengage when said actuator is not actuated.

21. The multispeed drive unit of claim 19, wherein said actuator comprises a hydraulic actuator.

22. The multispeed drive unit of claim 12, wherein said rotary input rotates at between 2 and 10 times faster than said rotary output when said ring gear is in said high-reduction configuration.

* * * * *